(12) United States Patent
Sakhnini et al.

(10) Patent No.: US 12,207,312 B2
(45) Date of Patent: Jan. 21, 2025

(54) JOINT RANDOM ACCESS CHANNEL OCCASION AND PHYSICAL UPLINK SHARED CHANNEL OCCASION SLOTS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/719,159

(22) Filed: Apr. 12, 2022

(65) Prior Publication Data
US 2022/0369385 A1 Nov. 17, 2022

Related U.S. Application Data

(60) Provisional application No. 63/187,230, filed on May 11, 2021.

(51) Int. Cl.
| | |
|---|---|
| *H04W 72/1268* | (2023.01) |
| *H04B 7/06* | (2006.01) |
| *H04L 27/26* | (2006.01) |
| *H04W 72/044* | (2023.01) |
| *H04W 72/0446* | (2023.01) |
| *H04W 72/1263* | (2023.01) |
| *H04W 74/08* | (2009.01) |
| *H04W 74/0833* | (2024.01) |

(52) U.S. Cl.
CPC ..... *H04W 74/0841* (2013.01); *H04L 27/2607* (2013.01); *H04W 72/0446* (2013.01); *H04W 72/046* (2013.01); *H04W 72/1263* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 2020/0396744 A1* | 12/2020 | Xiong | H04L 5/0051 |
| 2021/0329701 A1* | 10/2021 | Lei | H04W 74/0891 |
| 2022/0173856 A1* | 6/2022 | Ko | H04L 5/0053 |

(Continued)

FOREIGN PATENT DOCUMENTS

EP 4027741 B1 * 9/2023 ........... H04B 7/0811

*Primary Examiner* — Ajit Patel
(74) *Attorney, Agent, or Firm* — Loza & Loza, LLP

(57) ABSTRACT

A scheduled entity in a wireless communication network, configured to receive, and a scheduling entity configured to transmit, a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of the scheduling entity. According to some aspects, the joint RO and PO slot corresponds to a plurality of contiguous slots that collectively include a plurality of RO and PO combinations scheduled consecutively in time.

27 Claims, 15 Drawing Sheets

(56) References Cited

U.S. PATENT DOCUMENTS

2022/0408478 A1* 12/2022 Christoffersson .......................... H04W 74/0833
2023/0156782 A1* 5/2023 Li ........................ H04L 1/1887
370/329

* cited by examiner

JOINT RANDOM ACCESS CHANNEL OCCASION AND PHYSICAL UPLINK SHARED CHANNEL OCCASION SLOTS

CROSS-REFERENCE TO RELATED APPLICATIONS

This application for patent claims priority to and the benefit of provisional patent application No. 63/187,230 entitled "Joint Random Access Channel Occasion and Physical Uplink Shared Channel Occasion Slots" filed in the United States Patent and Trademark Office on May 11, 2021, the entire content of which is incorporated herein by reference as if fully set forth below in its entirety and for all applicable purposes.

TECHNICAL FIELD

The technology discussed below relates generally to wireless communication systems and, more particularly, to a joint random access channel (RACH) occasion (RO) and physical uplink shared channel (PUSCH) occasion (PO) slots.

INTRODUCTION

In current 5G new radio (NR) specifications, a scheduling entity may schedule a random access channel (RACH) occasion (RO) and a physical uplink shared channel (PUSCH) occasion (PO). Different scheduled entities in different locations within a cell served by the scheduling entity may utilize the RO to synchronize with the scheduling entity utilizing a RACH process (for example), and utilize the PO to transmit uplink traffic to the scheduled entity in a PUSCH (for example). The scheduling entity may utilize different respective antenna beams to communicate with the different respective scheduled entities in their different respective locations within the cell served by the scheduling entity. The scheduled entity may use a certain amount of time as it switches between a first beam serving a first scheduled entity during an RO and a second beam serving a second scheduled entity during a PO in the different locations within the cell.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a scheduled entity in a wireless communication network is disclosed. The scheduled entity includes a wireless transceiver, a memory, and a processor coupled to the wireless transceiver and the memory. According to one aspects, the processor and the memory are configured to receive a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot. According to this aspect, the at least the first RO and the at least the first PO correspond to each other and correspond to a first beam of a plurality of beams of a scheduling entity.

In another example, a scheduling entity in a wireless communication network is disclosed. The scheduling entity includes a wireless transceiver, a memory, and a processor coupled to the wireless transceiver and the memory. According to one aspect, the processor and the memory are configured to transmit a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot. According to this aspect, the at least the first RO and the at least the first PO correspond to each other and correspond to a first beam of a plurality of beams of the scheduling entity.

In another example, a method of wireless communication in a wireless communication network is disclosed. The method comprises, at a scheduling entity, transmitting a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot. According to one aspect, the at least the first RO and the at least the first PO correspond to each other and correspond to a first beam of a plurality of beams of the scheduling entity.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
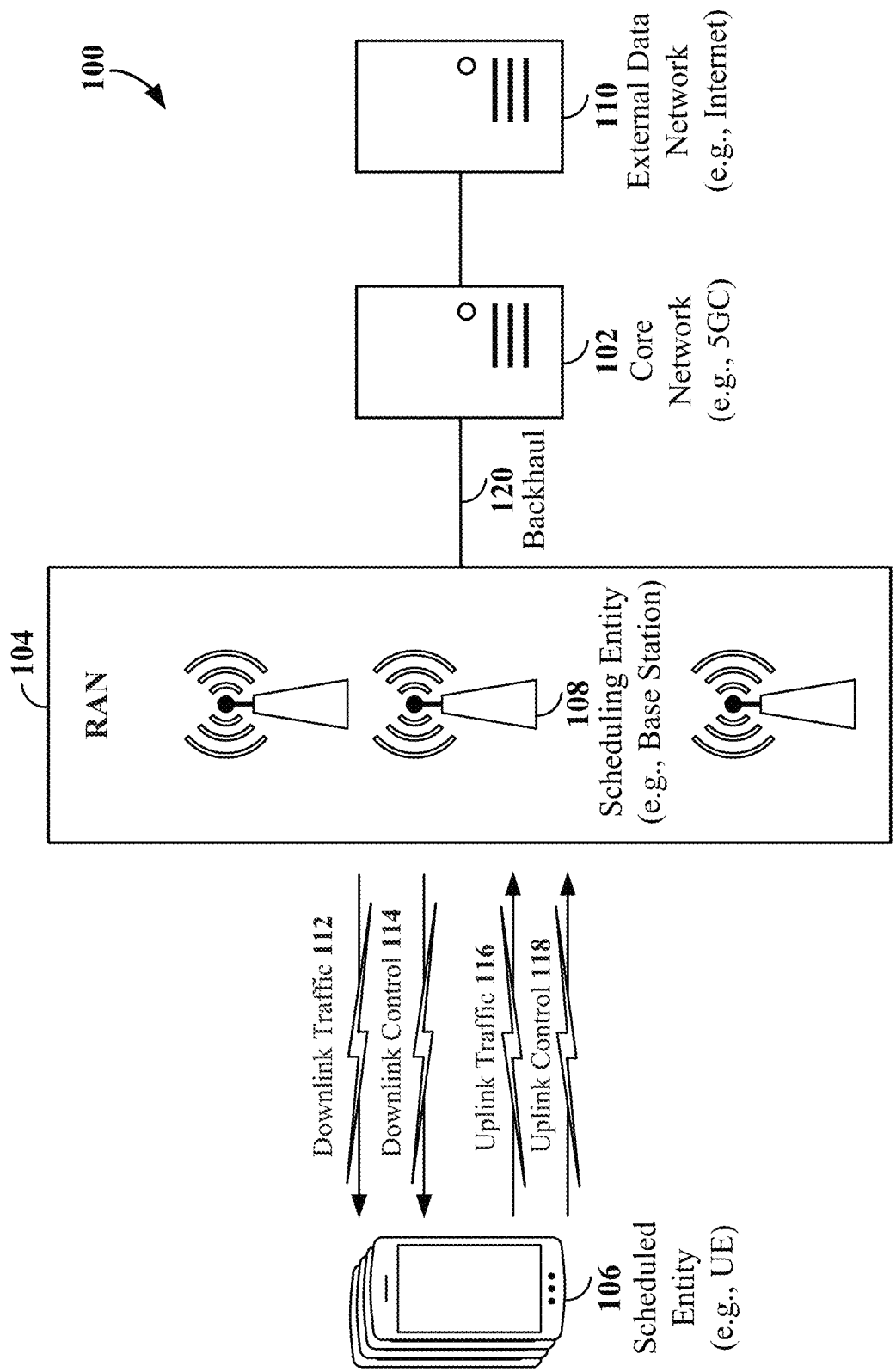
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some examples, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

A scheduling entity (e.g., a base station, a gNB) may utilize and schedule random access channel (RACH) occasions (ROs) and physical uplink shared channel (PUSCH) occasions (POs) for various scheduled entities. A scheduling entity may have an antenna with a plurality of beams (switchable, steered beams). Scheduled entities may be located throughout a cell. Accordingly, each scheduled entity may access the scheduling entity via a different one of the plurality of beams. According to some examples, a scheduling entity needs time to switch between beams. The switching may occur between ROs and POs utilized by different scheduled entities associated with different respective beams. The switching time may be referred to as beam switching gap time herein. Communication does not occur during the beam switching gap time. The cyclic prefix time for physical random access channel (PRACH) formats may be greater than the beam switching gap time for subcarrier spacings (SCSs) of 240 kHz and less. Accordingly, for SCS of 240 kHz and less, beam switching gap time has not posed a problem. However, as SCS increases, the cyclic prefix time decreases. When the orders of cyclic prefix time and beam switching gap time converge, additional time may be needed to account for the beam switching gap time, which, for SCS greater than 240 kHz, is greater than the cyclic prefix time. However, allocating one or more OFDM symbols to provide such an increased or new beam switching gap accounting time may be a waste of OFDM resources.

Furthermore, and by way of an example based on current New Radio (NR) systems, if additional beam switching gap accounting time is needed, it would be applied within both an RO group (e.g., an RO slot) and within a PO group (e.g., a PO slot) (i.e., two beam switching gap accounting time gaps would be utilized), which duplicates the beam switching gap accounting time and reduces OFDM resource utilization. However, according to some aspects described herein, a joint RO and PO slot may be defined so that the scheduling entity may not need to switch antennas beams between an RO and an associated PO for a given scheduled entity served by one antenna beam during the joint RO and PO slot. Eliminating the need to switch between antenna beams for ROs and POs associated with the given scheduled entity may facilitate a reduction in the overall beam switching gap accounting time and may avoid any need to duplicate beam switching gap accounting times.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information (e.g., downlink control 114), including but not limited to scheduling information (e.g., a grant), synchronization or timing information, or other control information from another entity in the wireless communication network such as the scheduling entity 108. The scheduled entity 106 may further transmit uplink control information (e.g., uplink control 118), including but not limited to a scheduling request or feedback information, or other control information to the scheduling entity 108.

In addition, the uplink and/or downlink control 118 and/or 114 information and/or uplink and/or downlink traffic 116 and/or 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per subcarrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5G core (5GC)). In other examples, the core network 102 may be configured according to a 4G evolved packet core (EPC), or any other suitable standard or configuration.

Figure 2:
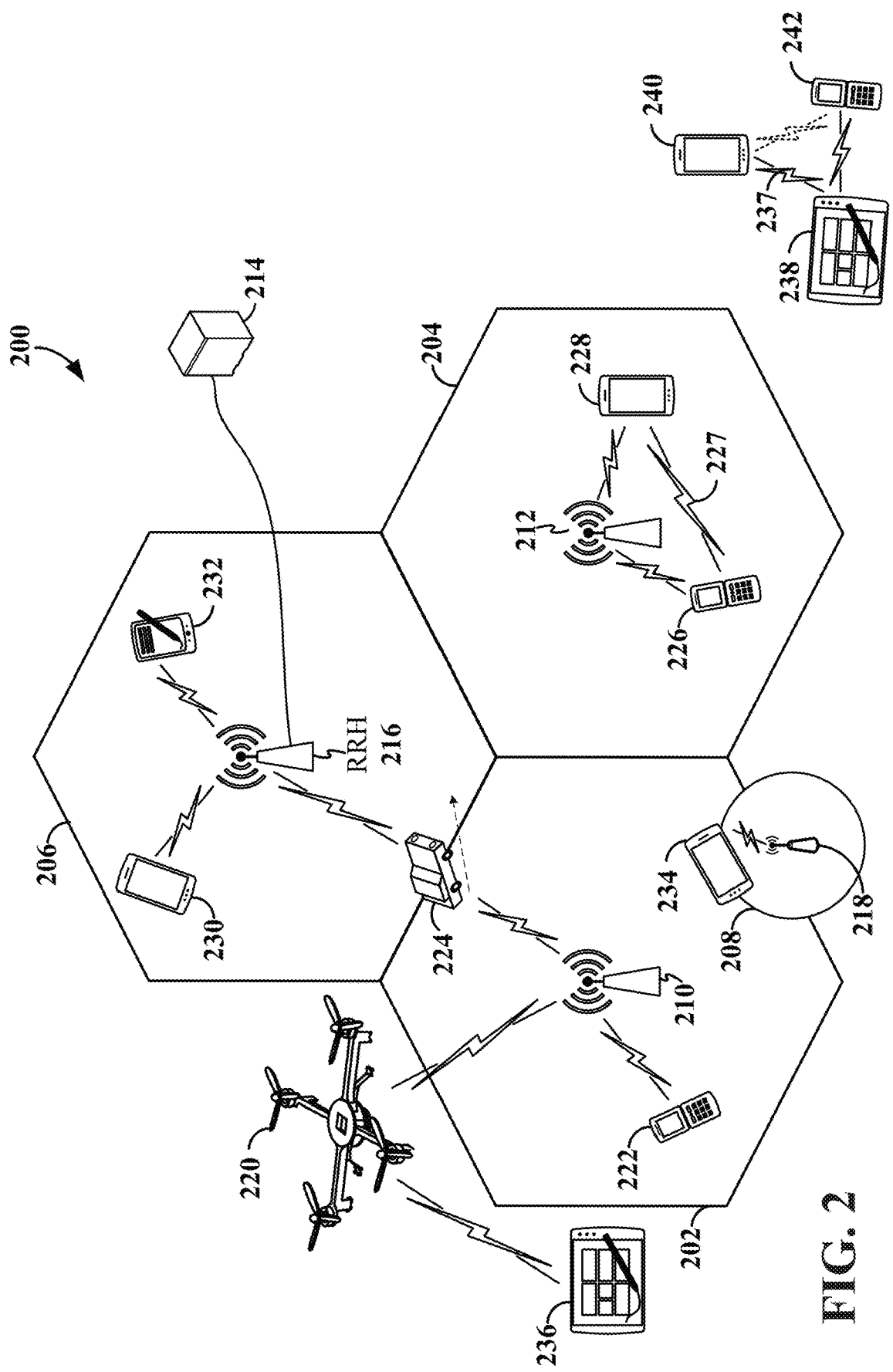
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 3:
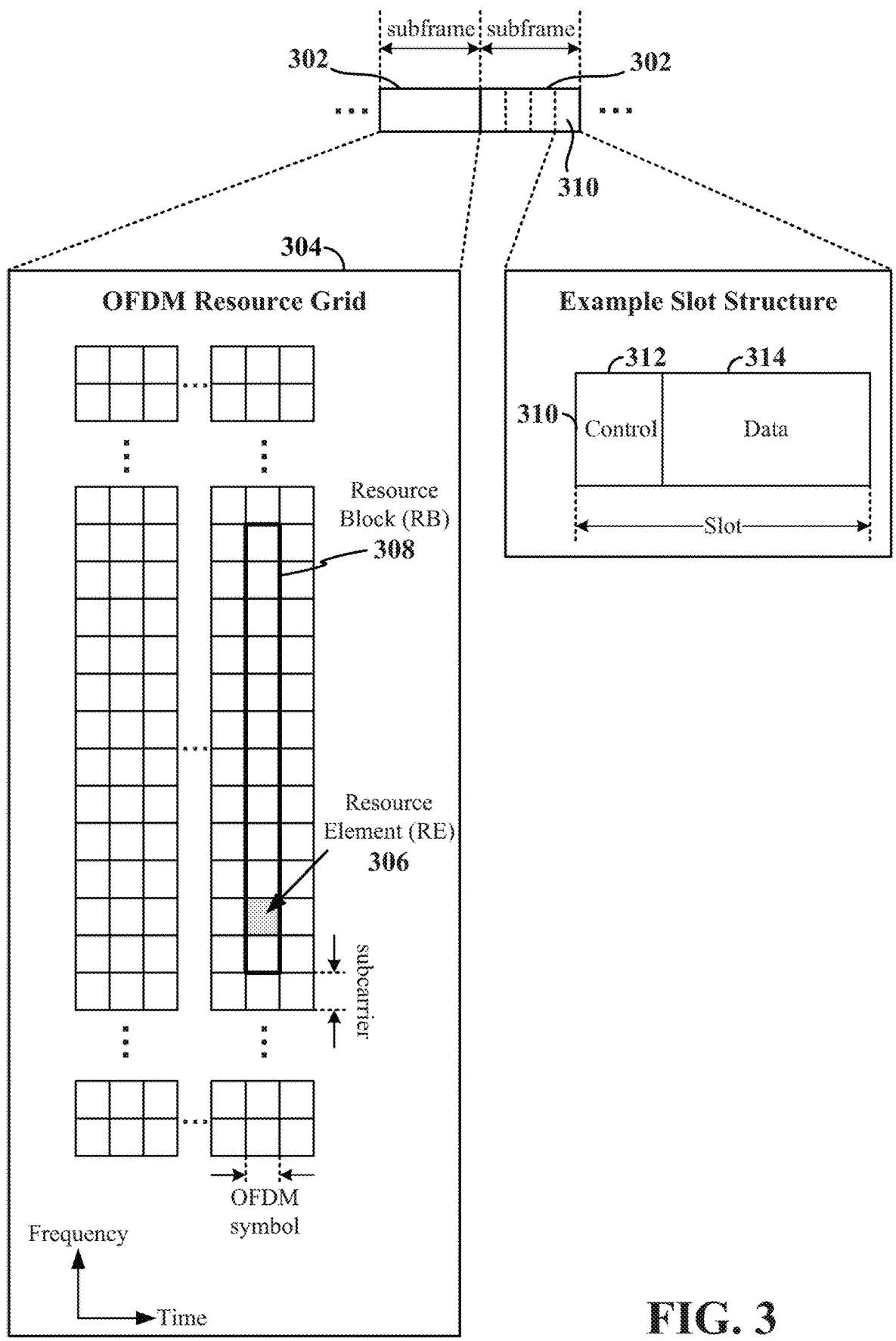
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure. However, as those skilled in the art will readily appreciate, the physical (PHY) transmission structure for any particular application may vary from the example described here, depending on any number of factors. Here, time is in the horizontal direction with units of OFDM symbols, and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1, 2, and 3 are not necessarily all of the channels or carriers that may be utilized between devices, and those of ordinary skill in the art will recognize that other channels or carriers may be utilized in addition to those illustrated, such as other traffic, control, and feedback channels.

In order to gain access to a cell, a UE may perform a random access procedure over a physical random access channel (PRACH). The UE may identify a random access search space including PRACH resources for initiating a RACH procedure from the SIB 1. For example, a random access process may be commenced after a UE acquires a cell and determines an occurrence of a RACH occasion (e.g., in PRACH resources) after reading a SSB and a SIB1.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

Figure 4:
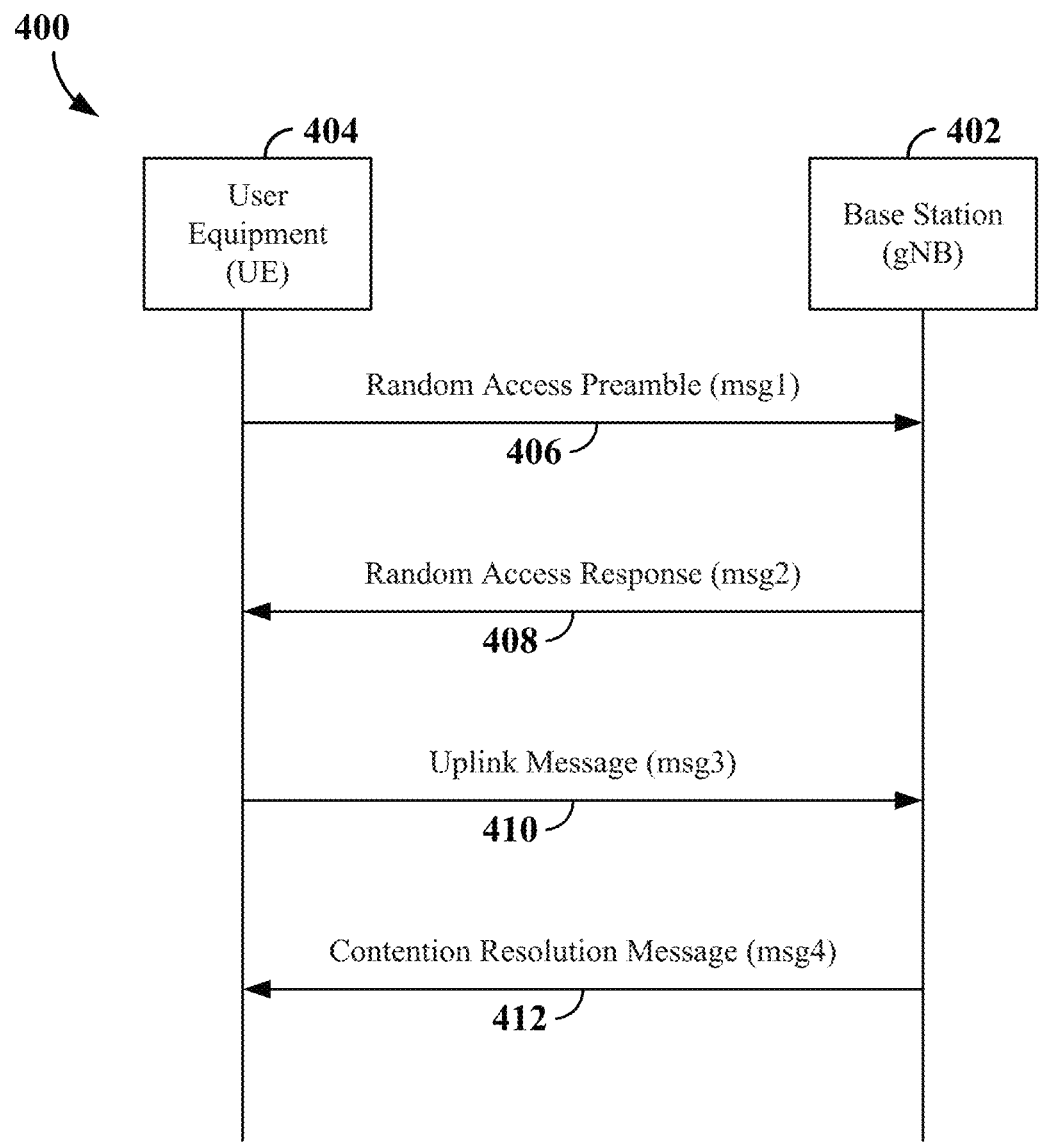
FIG. 4 is a diagram illustrating an example of a 4-step contention-based random access procedure between a base station and a user equipment according to some aspects of the disclosure.

FIG. 4 is a diagram illustrating an example of a 4-step contention-based random access (CBRA) procedure (hereinafter the 4-step RACH procedure 400) between a base station 402 and a UE 404 according to some aspects of the disclosure. The base station 402 (e.g., a scheduling entity, a gNB) may correspond, for example, to any of the scheduling entities shown in FIGS. 1 and/or 2. In addition, the UE 404 (e.g., a scheduled entity) may correspond, for example, to any of the scheduled entities shown in FIGS. 1 and/or 2.

The 4-step RACH procedure 400 shown in FIG. 4 is initiated by the UE 404 randomly selecting a preamble from an available set of preambles within the cell served by the base station 402, and transmitting the randomly selected preamble to the base station 402 in a RACH preamble message 406 (msg1). In an example, the UE 404 may select from 64 possible preamble sequences for inclusion in the RACH preamble message 406. The RACH preamble message 406 may be transmitted by the UE 404 over a selected PRACH resource with power ramping. The selected PRACH resource may include supplementary uplink resources or normal uplink resources. Here, supplementary uplink resources include lower frequency resources than normal uplink resources. Thus, supplementary uplink resources and normal uplink resources each correspond to a different respective uplink frequency band. The RACH preamble message 406 may further be communicated on a beam selected by the UE 404 based on beam measurements (e.g., RSRP/RSRQ/SINR) performed by the UE 404. The beam may correspond, for example, to an SSB beam.

If the preamble is successfully detected by the base station 402, the base station 402 transmits a random access response (RAR) message 408 (msg2) including a PDCCH and PDSCH to the UE 404. If no RAR message 408 is received within a RAR window, the UE 404 may retransmit the RACH preamble message 406 (msg1) with power boost. The RAR message 408 (msg2) (PDCCH+PDSCH) includes an identifier of the preamble sent by the UE 404, a timing advance (TA), a temporary cell (TC)-radio network temporary identifier (RNTI) (TC-RNTI), or random access (RA)-RNTI for the UE 404 and a grant of assigned uplink (UL) resources. The PDCCH in the RAR message 408 (msg2) may be scrambled with the RA-RNTI, which is a function of a RACH occasion (RO) (e.g., time-frequency resources allocated for RACH msg1) that the UE 404 used to send the RACH preamble message 406 (msg1). A medium access control-control element (MAC-CE) within the PDSCH provides an acknowledgment of the reception of the RACH preamble message 406 (msg1) and the UL grant. To receive the RAR message 408 (msg2), the UE 404 may monitor DCI 1_0 for the PDCCH scrambled with the RA-RNTI corresponding to the RO used by the UE 404 to transmit the RACH preamble message 406 (msg1), and if detected, proceeds with PDSCH decoding. Upon receipt of the RAR message 408, the UE 404 compares the preamble ID to the preamble sent by the scheduled entity in the RACH preamble message 406. If the preamble ID matches the preamble sent in the RACH preamble message 406, the UE 404 applies the timing advance and starts a contention resolution procedure.

Since the preamble is selected randomly by the scheduled entity, if another scheduled entity selects the same preamble in the same RO, a collision may result between the two scheduled entities. Any collisions may then be resolved using the contention resolution procedure. During contention resolution, the UE 404 transmits an uplink message (msg3) 410 on the common control channel (CCCH) using a timing advance (TA) and assigned uplink resources in the PDSCH of the RAR message 408 (msg2). In an example, the uplink message 410 is a Layer 2/Layer 3 (L2/L3) message, such as a Radio Resource Control (RRC) Connection Request message. The uplink message 410 includes an identifier of the UE 404 (UE-ID) for use by the scheduling entity (e.g., by base station 402) in resolving any collisions. Although other scheduled entities may transmit colliding uplink messages utilizing the TA and assigned uplink resources, these colliding uplink messages will likely not be successfully decoded at the scheduling entity since the colliding uplink messages were transmitted with TAs that were not intended for those scheduled entities.

Upon successfully decoding the uplink message 410, the base station 402 transmits a contention resolution message 412 (msg4) to the UE 404. The contention resolution message 412 may be, for example, an RRC-Connection Setup message. In addition, the contention resolution message 412 includes the identifier of the UE 404 that was received in the uplink message 410. The UE 404, upon receiving its own identity back in the contention resolution message 412, concludes that the random access procedure was successful and completes the RRC connection setup process. Any other scheduled entity receiving the RRC-Connection Setup message with the identity of the UE 404 will conclude that the random access procedure failed and re-initialize the random access procedure.

Figure 5:
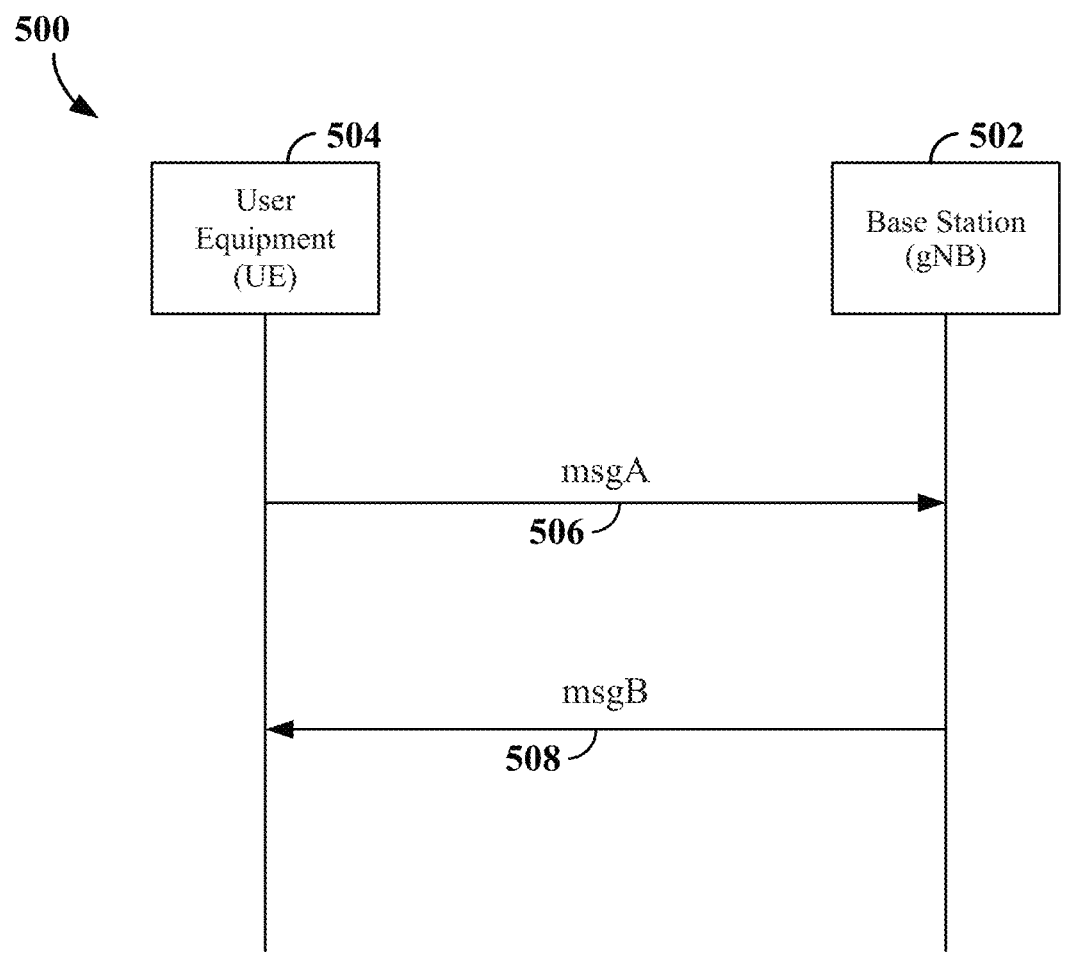
FIG. 5 is a diagram illustrating an example of a 2-step contention-based random access procedure between a base station and a user equipment according to some aspects of the disclosure.

The 4-step RACH procedure 400 can be compressed into the 2-step contention-based random access procedure (hereinafter the 2-step RACH procedure 500) illustrated in FIG. 5. The 2-step RACH procedure 500 reduces overhead and latency associated with control signaling by removing a transmission in each direction between the UE 504 and base station 502 or scheduling entity, such as the illustrated gNB. In comparison to FIG. 4, the 2-step RACH procedure 500 commences with a transmission by the UE 504 of a single message (msgA 506) that includes the RACH preamble message 406 and uplink message 410 sent in the 4-step RACH procedure 400. Here, the uplink message 410 may be a scheduled PUSCH transmission sent over a PUSCH resource and the RACH preamble message 406 may be sent over a selected PRACH resource. The base station 502 responds with a single message (msgB 508) that includes the RAR message 408 and the contention resolution message 412.

Figure 6:
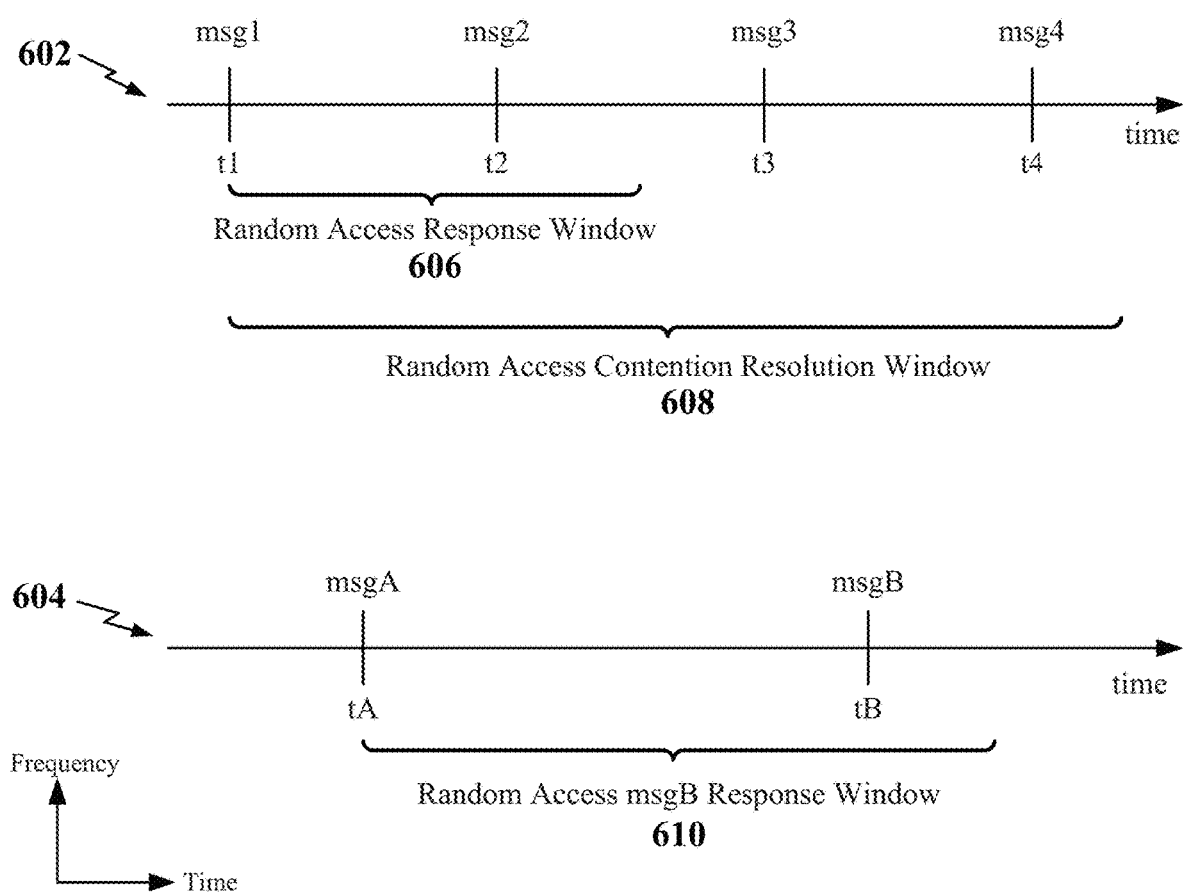
FIG. 6 is a diagram illustrating exemplary monitoring windows for random access according to some aspects of the disclosure.

FIG. 6 is a diagram illustrating exemplary monitoring windows for random access according to some aspects. In FIG. 6, the monitoring windows for a 4-step RACH procedure 602, and a 2-step RACH procedure 604 are illustrated. In the 4-step RACH procedure 602, a UE may transmit msg1 including, for example, a PRACH preamble message, at a first time (0) and initialize a random access response window 606 for monitoring for a random access response (msg2) upon transmitting the msg1. The UE may further initialize a random access contention resolution window 608 for monitoring for a contention resolution message (msg4) upon transmitting the msg1. As indicated above, during the random access response window 606, the UE monitors DCI 1_0 for the PDCCH scrambled with the RA-RNTI corresponding to the RO used by the UE to transmit msg1. If the UE receives msg2 within the random access response window 606 (e.g., at a second time (t2)), the UE may proceed with transmission of the uplink message (msg3) at a third time (t3) and then monitor for the contention resolution message (msg4), which may be received, for example, at a fourth time (t4) within the random access contention resolution window 608. If the UE does not receive msg2 within the random access response window 606 or msg4 within the random access contention resolution window 608, the UE may declare a RACH failure and select a new PRACH preamble to start the 4-step RACH procedure 602 over again.

In the 2-step RACH procedure 604, the UE may transmit msgA including, for example, the PRACH preamble message and uplink message, at a first time (tA). The UE may further initialize a random access msgB response window 610 for monitoring for msgB upon transmitting the msgA. To complete the random access procedure, the msgB may be received, for example, at a second time (tB) within the random access msgB response window 610. If the UE does not receive msgB within the random access msgB response window 610, the UE may declare a RACH failure and select a new PRACH preamble to start the 2-step RACH procedure 604 over again.

Long term evolution (LTE) and 5G new radio (5G NR) provide greater bandwidth, both in the uplink and downlink, compared to previous generations of cellular networks. In 5G NR networks, the increased bandwidth may be attributable to both the addition of FR2 and its greater bandwidth (e.g., in comparison to FR1) and an increase of the available channel bandwidth to 100 MHz in FR1. The preceding recitation of a network and frequency ranges are provided for illustrative and non-limiting purposes. Aspects described herein may be appliable to other networks and other frequency ranges, and the present application is not limited to any particular network configuration or frequency range.

Considered herein, with reference to, but not limited to 5G NR operation in FR2 (e.g., between 52.6 GHz and 71 GHz), are the physical layer aspects of initial access utilizing PRACH subcarrier spacing (SCS) of 480 kHz and 960 kHz. A PRACH SCS of 240 kHz and below, and any of the PRACH preamble formats discussed herein, may be supported for both initial access and non-initial access use cases. However, as PRACH SCS increases from 240 kHz to 480 kHz and 960 kHz, the cyclic prefix time for several PRACH preamble formats decreases toward, and then may become less than, a property of a scheduling entity's antenna array known as beam switching gap time. Beam switching gap time refers to the time it takes a scheduling entity to switch between antenna beams. When the orders of the cyclic prefix time of a PRACH format and the beam switching gap time correspond or closely correspond, and/or when the cyclic prefix time is less than the beam switching gap time, a portion of a signal may be lost. Aspects described herein may provide ways to account for beam switching gap time to avoid undesired loss of signals and increase the efficiency of using time-frequency resources.

Figure 7:
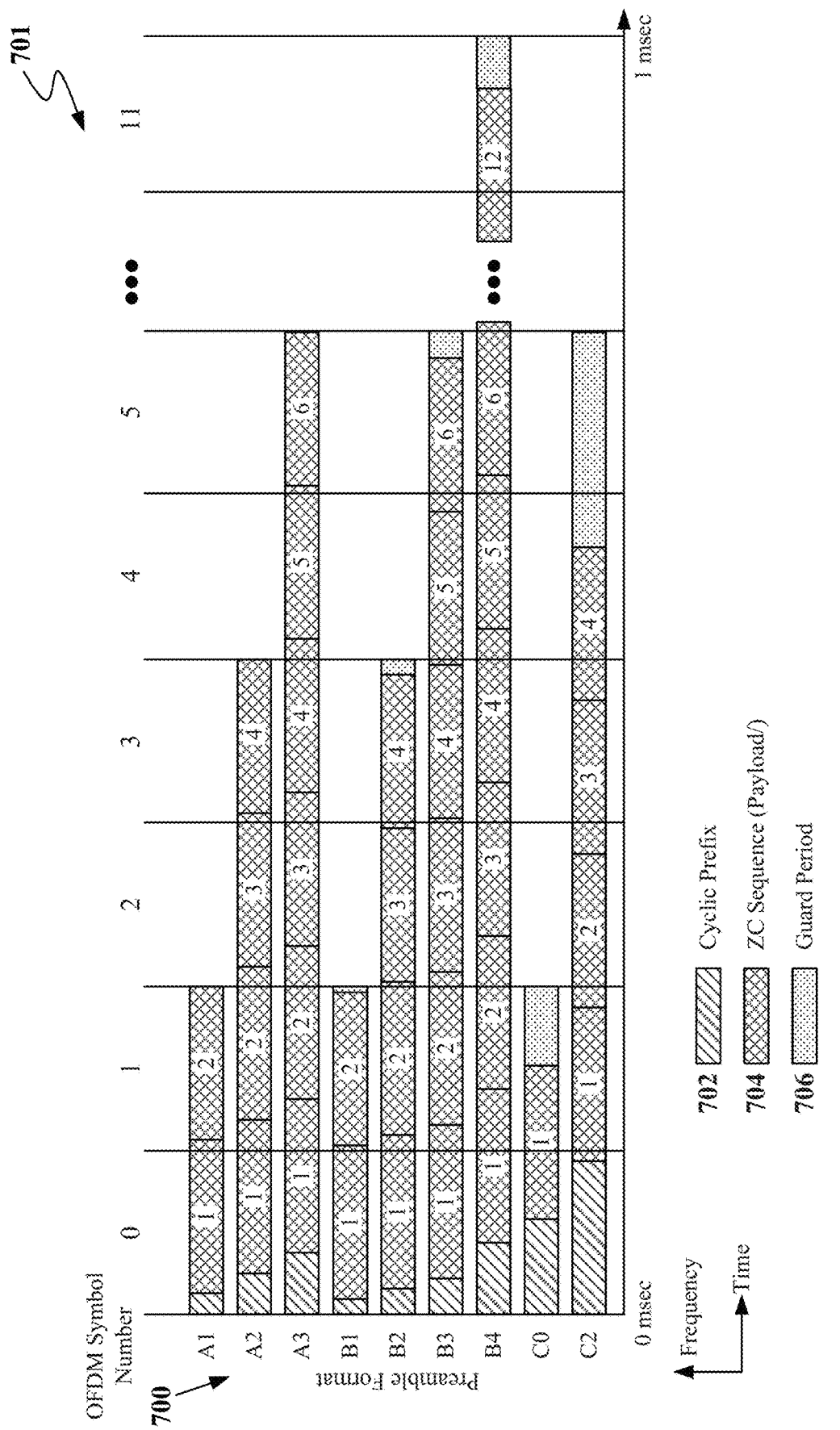
FIG. 7 is a diagram illustrating a time-domain structure of a plurality of PRACH preamble formats according to some aspects of the disclosure.

Aspects described herein may support up to 64 SSB beams for licensed and unlicensed operation in FR2 (e.g., between 52.6 GHz and 71 GHz), for example. In the examples described herein, short PRACH preamble formats are considered. However, the use of long or short PRACH preamble formats is within the scope of the disclosure. As shown in the example of FIG. 7, there may be nine short PRACH preamble formats, identified as formats A1, A2, A3, B1, B2, B3, B4, C0, and C2. The PRACH preamble formats may support multiple cell sizes and coverage requirements. These PRACH preamble formats may be used to format RACH occasions (ROs), which will be discussed in connection with FIG. 8. For FR2, with numerology $\mu \in \{2, 3\}$, the PRACH preamble formats are given in Table I, below. In Table I:

TABLE I

PRACH Preamble Formats for Zadoff-Chu Sequence Length ($L_{RA}$) of 139

| PRACH Preamble Format | $L_{RA}$ (ZC sequence length) | Number of OFDM Symbols | $N_u$ (Number of ZC Sequence Repetitions multiplied by a constant) | $N_{CP}^{RA}$ | Number of Guard Samples |
|---|---|---|---|---|---|
| A1 | 139 | 2  | $2 \cdot 2048\kappa \cdot 2^{-\mu}$  | $288\kappa \cdot 2^{-\mu}$  | 0 |
| A2 | 139 | 4  | $4 \cdot 2048\kappa \cdot 2^{-\mu}$  | $576\kappa \cdot 2^{-\mu}$  | 0 |
| A3 | 139 | 6  | $6 \cdot 2048\kappa \cdot 2^{-\mu}$  | $864\kappa \cdot 2^{-\mu}$  | 0 |
| B1 | 139 | 2  | $2 \cdot 2048\kappa \cdot 2^{-\mu}$  | $216\kappa \cdot 2^{-\mu}$  | $72\kappa \cdot 2^{-\mu}$ |
| B2 | 139 | 4  | $4 \cdot 2048\kappa \cdot 2^{-\mu}$  | $360\kappa \cdot 2^{-\mu}$  | $216\kappa \cdot 2^{-\mu}$ |
| B3 | 139 | 6  | $6 \cdot 2048\kappa \cdot 2^{-\mu}$  | $504\kappa \cdot 2^{-\mu}$  | $360\kappa \cdot 2^{-\mu}$ |
| B4 | 139 | 12 | $12 \cdot 2048\kappa \cdot 2^{-\mu}$ | $936\kappa \cdot 2^{-\mu}$  | $792\kappa \cdot 2^{-\mu}$ |
| C0 | 139 | 2  | $1 \cdot 2048\kappa \cdot 2^{-\mu}$  | $1240\kappa \cdot 2^{-\mu}$ | $1096\kappa \cdot 2^{-\mu}$ |
| C2 | 139 | 6  | $4 \cdot 2048\kappa \cdot 2^{-\mu}$  | $2048\kappa \cdot 2^{-\mu}$ | $2912\kappa \cdot 2^{-\mu}$ |

$L_{RA}$ = Zadoff-Chu (ZC) sequence length;
$N_u$ = a number (i.e., a quantity) of ZC sequence repetitions, x, multiplied by the constant $2048\kappa \cdot 2^{-\mu}$ (where $x \in \{1, 2, 4, 6, 12\}$);
$\kappa$ = TS/TC = 64; and
$N_{CP}^{RA}$ = the length of the cyclic prefix (CP).

Although not shown in Table I, the frequency span occupied by a PRACH preamble ($\Delta f^{RA}$) be given by the equation $\Delta f^{RA}=15*2^{\mu}$ kHz, where $\mu=\{0, 1, 2, 3\}$. Accordingly, the frequency span occupied by a PRACH preamble is a function of numerology (and of SCS by extension).

FIG. 7 is a diagram illustrating a time-domain structure of a plurality of PRACH preamble formats 700 according to some aspects of the disclosure. Parameters related to the preamble formats A1, A2, A3, B1, B2, B3, B4, C0, and C2 are identified above in Table I. In FIG. 7, time is in the horizontal direction with units of OFDM symbols, and frequency is in the vertical direction with units of subcarriers of the carrier. The PRACH preamble formats 700 are depicted along the vertical axis for ease of illustration. Each PRACH preamble format 700 may be used with any subcarrier. The sequential order, from A to B to C, is also for ease of illustration. Any PRACH preamble format 700 may be used at any subcarrier frequency without regard to the type of PRACH preamble format 700 used at a higher or lower frequency subcarrier. OFDM symbol numbers (0-11) are provided for ease of reference.

One or more RACH symbols (i.e., ZC sequences 704) are depicted with each PRACH preamble format 700. As shown, a RACH symbol does not necessarily correspond to an OFDM symbol.

The time-domain structure of each PRACH preamble format 700 may include three sections: a cyclic prefix 702, a ZC sequence 704, and optionally a guard period 706. Formats A1, A2, and A3 do not have guard periods. Formats B1, B2, B3, and B4 each have guard periods 706 at their ends. Formats C0 and C2 have cyclic prefixes 702 larger than the cyclic prefixes 702 of the other formats and have guard periods 706 larger than the guard periods 706 of the other formats.

PRACH preambles may be transmitted during RACH occasions (RO) (described in connection with FIG. 8) according to a given PRACH preamble format 700. The PRACH preamble format may convey the number of ZC sequence 704 repetitions. A PRACH preamble may be sent in the uplink by a scheduled entity (e.g., a UE) to a scheduling entity (e.g., a base station, a gNB) over a PRACH channel. The PRACH preamble may be sent to obtain UL synchronization and to identify which synchronization signal block (SSB) (e.g., antenna beam(s)) is acquired and used by the scheduled entity. There are 64 PRACH preambles available for each time-frequency RACH occasion (RO). The 64 PRACH preambles may be associated with 64 SSBs (e.g., used with 120 kHz SCS). The ZC sequence 704 of each PRACH preamble format 700 may be repeated.

The number of ZC sequence 704 repetitions associated with each PRACH preamble format 700 is given in Table I in connection with the parameter $N_u$ (i.e., by an integer value (1, 2, 4, 6, 12) of the parameter $N_u$) and is shown in FIG. 7. The ZC sequence 704 of PRACH preamble formats A1 and B1 are repeated twice. The ZC sequence 704 of PRACH preamble formats A2, B2, and C2 are repeated four times. The ZC sequence 704 of PRACH preamble formats A3 and B3 are repeated six times. The ZC sequence 704 of PRACH preamble format B4 is repeated twelve times. The ZC sequence 704 of PRACH preamble format C0 is not repeated (i.e., it is presented once).

PRACH formats A1, A2, and A3 include a cyclic prefix (CP) 702 and one or more ZC sequences 704. The cyclic prefix length, $N_{CP}^{RA}$ and the number of repetitions of the ZC sequence are given in Table I. As depicted, formats A1, A2, and A3 have no guard bands, whereas B1, B2, B3, B4, C0, and C2 have guard bands (e.g., one or more guard periods). In Table I, the presence or absence of guard bands is reflected in the parameter given as the Number of Guard Samples. For example, the Number of Guard Samples=0 for formats A1, A2, and A3, indicating an absence of guard bands for those formats. In some aspects, an absence or presence of a guard band may be indicated in terms of PRBs. For example, the absence of a guard band may be indicated as 0 PRBs, while the presence of a guard band may be indicated as one or more PRBs.

In contrast, PRACH formats B1, B2, B3, B4, C0, and C2 each have a cyclic prefix 702, one or more repetitions of ZC sequences 704, and guard periods 706. The duration of each guard period 706 is represented by the parameter Number of Guard Samples in Table I. The Number of Guard Samples range in duration from $72\kappa \cdot 2^{-\mu}$ to $2912\kappa \cdot 2^{-\mu}$ where $\kappa=64$ and $\mu \in \{2, 3\}$.

According to aspects herein, ROs and corresponding POs for a given beam may be grouped in joint RO and PO slots instead of standing alone in RO slots and separate PO slots. According to other aspects, the ROs and corresponding POs for the given beam may be grouped in a contiguous set of slots (e.g., where one or more of the contiguous set of slots includes an RO, a PO, or a joint RO and PO). Grouping into joint RO and PO slots (or the contiguous set of slots) for a given beam saves resources that would otherwise go unused while waiting for a scheduling entity to switch between beams to receive and transmit data with various scheduled entities at various locations.

With subcarrier spacings of 15-240 kHz, the cyclic prefix time of PRACH formats A, B, and C is adequate to account for a scheduling entity's beam switching gap time. However, as higher subcarrier spacings (e.g., 480-960 kHz) are used, the cyclic prefix time approaches and becomes less than the beam switching gap time. When the orders of cyclic prefix time and beam switching gap time converge, an increase in time, over the average beam switching gap time, may be needed to account for the relatively similar durations of the cyclic prefix time and the beam switching gap time and to avoid loss of any portion of a signal occurring during an RO and an associated PO. Aspects described herein may provide for the use of a joint RO and PO slot (or a plurality of contiguous RO and corresponding PO slots) where groups of ROs and POs associated with a first beam and groups of ROs and POs associated with a second beam can be sequenced in time. Aspects described herein may also provide a settable/configurable beam switching gap accounting time (e.g., a duration) between groups of ROs and POs associated with a first beam and groups of ROs and POs associated with a second beam.

As explained in greater detail below, a RACH occasion (RO) corresponds to time and frequency resources available to a UE to transmit a RACH preamble in the uplink. In 5G NR, different beams may be associated with different respective SSBs. A UE may select a beam (corresponding to one SSB) and may send a message (e.g., msg1, msgA) during the RO using that selected beam. A specific mapping between SSBs and ROs may be provided. By detecting which RO a UE selected for PRACH, a base station (e.g., gNB) may determine the beam selected by the UE (e.g., based on the mapping between SSBs and ROs). Similarly, a PUSCH occasion (PO) corresponds to time and frequency resources available for transmission by a UE of PUSCH in the uplink A PUSCH occasion may be associated with a DMRS resource.

The random access procedure in 5G NR may be either type-1 (4-step RACH procedure) or type-2 (2-step RACH procedure). As described in connection with FIGS. 4 and 6, a 4-step RACH procedure may include:
  msg1 (UL): PRACH preamble,
  msg2 (DL): Random Access Response (RAR),
  msg3 (UL): PUSCH message, and
  msg4 (DL): contention resolution message.

A 2-step RACH procedure combines the messages from the 4-step RACH procedure into two messages. As described in connection with FIGS. 5 and 6, a 2-step RACH procedure may include:
  msgA (UL): combines msg1 and msg3 from the 4-step RACH procedure and includes two parts:
    a preamble part, which may be equivalent to msg1 in the 4-step RACH procedure; and
    a payload part, which may be equivalent to msg3 in the 4-step RACH procedure, and
  msgB (DL): combines msg2 and msg4 from the 4-step RACH procedure.

The motivations for the 2-step RACH procedure include the ability of the 2-step RACH procedure to reduce the latency and signaling overhead compared to the 4-step RACH procedure, and the provision of support of timing advance (TA)-free and grant-free small UL packet transmissions. The 2-step RACH procedure also provides improved capacity and power efficiency relative to the 4-step RACH procedure.

Figure 8:
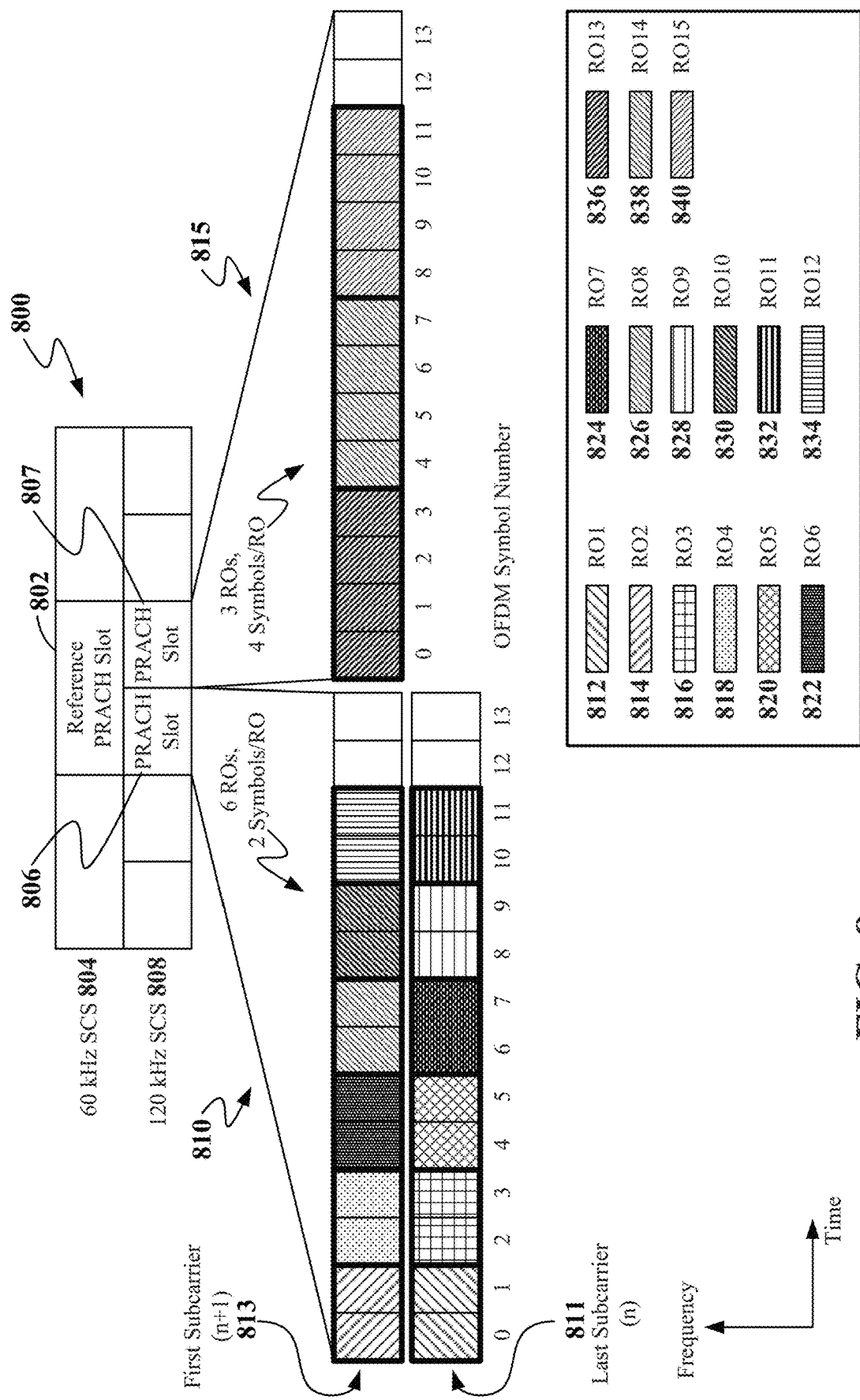
FIG. 8 is a diagram illustrating a portion of a time-frequency resource grid according to some aspects of the disclosure.

FIG. 8 is a diagram illustrating a portion of a time-frequency resource grid 800 according to some aspects of the disclosure. Here, time is in the horizontal direction with units of OFDM symbols, and frequency is in the vertical direction with units of subcarriers of the carrier. The depictions of the symbols within the adjacent PRACH slots (first PRACH slot 806 and second PRACH slot 807) are illustrative and non-limiting. They are provided for purposes of explanation and may not be illustrative of the contents of adjacent PRACH slots that may be configured according to present 5G NR standards. FIG. 8 depicts a Reference PRACH slot 802 among a plurality of 60 kHz SCS slots 804. The Reference PRACH slot 802 may be defined corresponding to a 60 kHz SCS slot 804 number in a given radio frame (e.g., a radio frame with 60 kHz SCS includes 40 slots). There may be more than one (e.g., 2, 4, 8, 10, etc.) Reference PRACH slot 802 in a given radio frame. Although depicted in the 60 kHz SCS slot 804, Reference PRACH slots may be used in slots having other than the 60 kHz SCS.

In some examples, a table (e.g., in a standard) may exist that defines, for example, the number of Reference PRACH slots (such as Reference PRACH slot 802) per radio frame. The table may cross-reference a PRACH configuration index number (not shown) to: a preamble format (such as one of the preamble formats 700 of FIG. 7), a quantity of and slot number of one or more Reference PRACH slot numbers (e.g., the table may identify two slots, such as 60 kHz SCS slot numbers 19 and 39 of 40 slots numbered from 0 to 39), a starting symbol number of a RACH occasion in a PRACH slot (e.g., in a 120 kHz PRACH slot aligned with the first or second half of the 60 kHz Reference PRACH slot) (e.g., starting symbol number 0, 2, 5, 7, or 8 in the first PRACH slot 806 and/or the second PRACH slot 807 among the 120 kHz SCS slots 808), the number of PRACH slots within a Reference PRACH slot that may contain RO(s), where, for example, the number may be one or two (e.g., while two 120 kHz SCS slots are within (coincide in time with, correspond in time with) one 60 kHz SCS slot, in some examples, only one of the two 120 kHz SCS slots may be identified as a PRACH slot that includes RO(s), in other examples both 120 kHz SCS slots may include RO(s)), the number of time-domain RACH occasions (ROs) within a PRACH slot (e.g., first PRACH slot 806 has six time-domain ROs and second PRACH slot 807 has three time-domain ROs), and the duration (i.e., the number of symbols) per RO (e.g., each of the six time-domain ROs in the first PRACH slot 806 has two symbols, while each of the three time-domain ROs in the second PRACH slot 807 has four symbols). A set of one or more PRACH slots (e.g., first PRACH slot 806 and second PRACH slot 807) may be included in a radio frame (not shown). Furthermore, in every PRACH configuration period, there can be one or more Reference PRACH slots (e.g., 60 kHz Reference PRACH slot 802). A set of one or more PRACH slots (e.g., first PRACH slot 806 and second PRACH slot 807) may be repeated every PRACH configuration period (not shown).

FIG. 8 also depicts an expanded view 810 of the first PRACH slot 806. The first PRACH slot 806 includes fourteen OFDM symbols (corresponding to OFDM symbol numbers 0-13) along the horizontal (time) axis. For illustrative purposes and without limitation, the expanded view 810 of the first PRACH slot 806 depicts two subcarriers along the vertical (frequency) axis, namely, a last subcarrier (n) 811 that includes a first RO (RO1 812) and a first subcarrier (n+1) 813 that includes a second RO (RO2 814).

As described above, within the first PRACH slot 806 (e.g., within a first RACH occasion (RO)), there may be a number of RACH occasions (ROs). The number of ROs may depend on the PRACH preamble format configured to the scheduled entity. There are several combinations of the numbers of ROs in a PRACH slot and the duration (e.g., the number of symbols) of each RO in the PRACH slot. For example, and without limitation, one RO may have twelve symbols, six ROs may each have two symbols, or three ROs may each have four symbols. The preceding combinations are exemplary and non-limiting. Other combinations are within the scope of the disclosure.

In the example of FIG. 8, for explanatory and non-limiting purposes, the scheduling entity has scheduled six ROs of two symbols per RO in the first PRACH slot 806 and three ROs of four symbols per RO in the second PRACH slot 807. In the first PRACH slot 806, a first RO, RO1 812, includes OFDM symbol numbers 0 and 1 in the resources shown on the lower left (e.g., last subcarrier (n) 811). A second RO, RO2 814, includes OFDM symbol numbers 0 and 1 in the resources shown on the upper left (e.g., first subcarrier (n+1) 813). A third RO, RO3 816, includes OFDM symbol numbers 2 and 3 in the resources shown on the lower left. A fourth RO, RO4 818, includes OFDM symbol numbers 2 and 3 in the resources shown on the upper left. A fifth RO, RO5 820, includes OFDM symbol numbers 4 and 5 in the resources shown on the lower left. A sixth RO, RO6 822, includes OFDM symbol numbers 4 and 5 in the resources shown on the upper left. A seventh RO, RO7 824, includes OFDM symbol numbers 6 and 7 in the resources shown on the lower left. An eighth RO, RO8 826, includes OFDM symbol numbers 6 and 7 in the resources shown on the upper left. A ninth RO, RO9 828, includes OFDM symbol numbers 8 and 9 in the resources shown on the lower left. A tenth RO, RO10 830, includes OFDM symbol numbers 8 and 9 in the resources shown on the upper left. An eleventh RO, RO11 832, includes OFDM symbol numbers 10 and 11 in the resources shown on the lower left. A twelfth RO, RO12 834, includes OFDM symbol numbers 10 and 11 in the resources shown on the upper left. The OFDM symbols 12 and 13 of the lower left and upper left resources are not used.

In an expanded view 815 of the second PRACH slot 807, a thirteenth RO, RO13 836, includes OFDM symbol numbers 0-3. A fourteenth RO, RO14 838, includes OFDM symbol numbers 4-7. A fifteenth RO, RO3 840, includes OFDM symbol numbers 8-11. The OFDM symbols 12 and 13 of the right resources are not used.

A PRACH may be sent from a scheduled entity (e.g., a UE) to a scheduling entity (e.g., a base station, a gNB) on a RACH Occasion (RO) (e.g., RO1 812-RO15 840). An RO may be formatted using the PRACH preamble formats discussed above (e.g., formats A1, A2, A3, B1, B2, B3, B4, C0, C2 of FIG. 7). As illustrated in the example of FIG. 8, multiple ROs may be configured in a PRACH slot, such as the first PRACH slot 806 and the second PRACH slot 807.

ROs may be used in association with synchronization signal blocks (SSBs). For example, a scheduling entity may use an SSB-to-RO association to ensure that the scheduling entity is aware of which beam a given scheduled entity has acquired or is using (e.g., beam establishment). For example, in FR2, with 120 kHz SCS, there may be up to 64 beams (e.g., up to 64 SSB beams may be candidates for use by a scheduled entity). A scheduled entity, upon initial access, may acquire any one of the 64 SSB beams (e.g., the scheduled entity acquires SSB beam 5 because beam 5 provided the strongest signal). The scheduling entity may be informed that the scheduled entity acquired SSB beam 5 based on a mapping between the SSBs and ROs. By way of example and not limitation, using FIG. 8 as an example without limitation, RO1 812 may be mapped to a first SSB, RO2 814 may be mapped to a second SSB, and so on. One SSB may be associated with one or more ROs (e.g., there may be a one-to-one or a one-to-many mapping).

Additionally, more than one SSB may be associated with one RO (e.g., a many-to-one mapping). Therefore, a scheduled entity may select a given RO that is mapped to the SSB beam acquired by the scheduled entity. The scheduled entity may transmit a PRACH preamble during the selected RO to inform the scheduling entity of the identity of the acquired SSB beam. Using the example above, where the scheduled entity acquired the fifth (out of 64) SSB beams, the scheduled entity may select RO5 820 (where, in the example, the fifth SSB beam is mapped to RO5 820) to transmit a PRACH preamble to the scheduling entity. The scheduling entity, which is aware of the mapping of the $5^{th}$ SSB beam to RO5 820, is accordingly informed that the scheduled entity has acquired the $5^{th}$ SSB beam.

A specific mapping structure may be used in connection with an SSB-to-RO association. For example, if one SSB is mapped to more than one RO (e.g., 4 or 8 ROs), the scheduling entity may identify (and thereby differentiate) the more than one RO in the frequency domain. For example, RO1 812 may be mapped to OFDM symbols 0 and 1 in the last subcarrier (n) 811 in the first PRACH slot 806. RO2 814 may be mapped to OFDM symbols 0 and 1 in the first subcarrier (n+1) 813 in the first PRACH slot 806. Then the mapping may proceed in the time domain within the first PRACH slot 806. For example, the RO3 816 may be mapped to OFDM symbols 2 and 3 in the last subcarrier (n) 811 in the first PRACH slot 806. RO4 818 may be mapped to OFDM symbols 2 and 3 in the first subcarrier (n+1) 813 in the first PRACH slot 806. Subsequent mappings may proceed in the time domain across RACH slots. For example, RO13 836 may be mapped to OFDM symbols 0-3 in the second PRACH slot 807.

An association period may be defined as a minimum number of RACH configuration periods (i.e., the period of repetition of a set of one or more RACH slots) such that all SSB beams are mapped into ROs. In other words, the association period may represent the minimum time, in terms of the RACH configuration period, for all the SSBs to be associated with (mapped into) ROs. The association period may be a scheduling entity (e.g., a gNB of a cell) rather than a scheduled entity (e.g., a UE) configuration.

As stated, a scheduled entity may transmit a PRACH preamble during a selected RO to inform the scheduling entity of the identity of the acquired SSB beam. The RO may be formatted using the PRACH preamble formats (e.g., A1, A2, A3, B1, B2, B3, B4, C0, C2 of FIG. 7) described above and exemplified in Table I above. The format used may depend on the number of ROs and the symbols per RO that were configured to the scheduled entity.

For example, in FIG. 8, six ROs of two OFDM symbols per RO are configured for each subcarrier (e.g., last subcarrier (n) 811 and first subcarrier (n+1) 813) in the first PRACH slot 806. From Table I, it can be observed that only formats A1, B1, and C0 are used with two OFDM symbols. Therefore, the scheduled entity may transmit a PRACH preamble formatted using either the A1, B1, or C0 formats on any one of RO1 812-RO12 834. By way of another example, again using the example of FIG. 8, three ROs of four OFDM symbols per RO are configured in the second PRACH slot 807. From Table I, it can be observed that only formats A2 and B2 are used with four OFDM symbols. Therefore, the scheduled entity may transmit a PRACH preamble formatted using either the A2 or B2 formats on any one of RO13 836, RO14 838, and/or RO15 840.

Figure 9B:
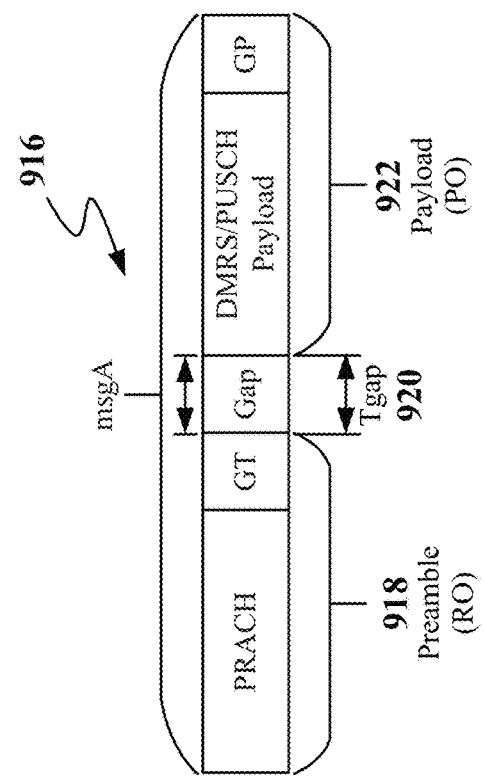
FIGS. 9A and 9B are schematic representations of random access channel occasions and physical uplink shared channel occasions according to some aspects of the disclosure.
Figure 9A:
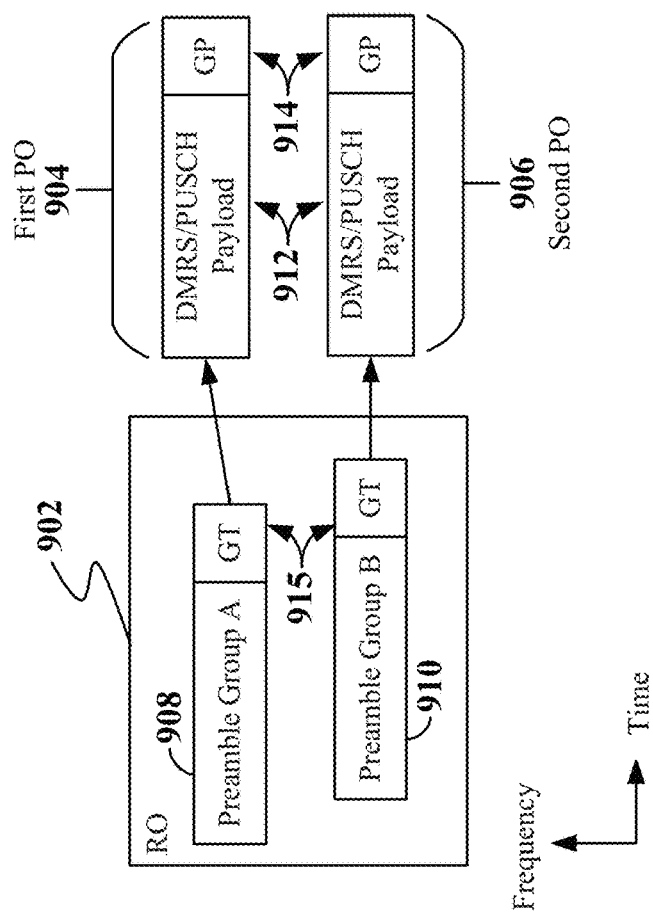

FIGS. 9A and 9B are schematic representations of RACH occasions (ROs) and physical uplink shared channel (PUSCH) occasions (POs) according to some aspects of the disclosure. In both FIGS. 9A and 9B, time is in the horizontal direction, and frequency is in the vertical direction. The relative orientations in both time and frequency of the various ROs and POs of FIGS. 9A and 9B are provided for ease of illustration and are not limiting. FIG. 9A depicts an RO 902 (similar to the ROs 812-840 of FIG. 8) and two POs (first PO 904 and second PO 906) according to some aspects described herein. The first PO 904 and the second PO 906 each include a DMRS/PUSCH payload 912 and a guard period (GP) 914 appended to the end of the DMRS/PUSCH payload 912. The RO 902 may have two preamble groups (preamble group A 908 and preamble group B 910). Preamble group A 908 and preamble group B 910 may be configured with a different mapping to POs. For example, in FIG. 9A, preamble group A 908 is mapped to the first PO 904. Preamble group B 910 is mapped to the second PO 906. Each preamble group may include a guard time (GT) 915, as depicted in the example of FIG. 9A. In this example, for convenience and ease of distinguishing between POs and ROs, GP 914 is associated with POs and GT 915 is associated with ROs. There may be a one-to-one or one-to-many mapping between ROs and POs. FIG. 9A is an example of a one-to-many mapping (e.g., the RO 902 is mapped to the first PO 904 and the second PO 906). The one-to-one or one-to-many mapping may be configured to the scheduled entity. It is noted that the PUSCH configuration (e.g., FDRA, TDRA, DMRS, MCS, etc.) may be pre-signaled to the scheduled entity (e.g., semi-statically). The DMRS may be used in a contention-based RACH procedure, for example.

FIG. 9B illustrates the parts of a msgA 916 according to some aspects described herein. As illustrated, the msgA 916 includes a preamble part 918 (corresponding to an RO as shown and described on connection with FIGS. 7 and 8, for example), a time gap ($T_{Gap}$ 920), and a payload part 922 (corresponding to a PO, such as the first PO 904 or the second PO 906 of FIG. 9A). Like the RO, a PO is a time-frequency set of resources. The preamble part 918 (i.e., the PRACH with guard period (GP)) may be sent from the scheduled entity (e.g., the UE) on a RACH occasion (RO). The payload part 922 (i.e., the PUSCH with the guard period (GP)) may be sent from the scheduled entity (e.g., the UE) on a PUSCH occasion (PO). As shown in FIG. 9B, the msgA payload part 922 may include the PUSCH and a DMRS. In FIG. 9A, the RO 902 and the first PO 904 and/or the second PO 906 may be in the same slot or in contiguous slots. In FIG. 9B, the RO (e.g., preamble part 918) and the PO (e.g., payload part 922) may be in the same slot or contiguous slots.

In FIG. 9B, to allow for changes between PRACH and PUSCH (e.g., SCS, BW, etc.), a minimum gap time is assumed between the msgA preamble part 918 and the msgA payload part 922. The minimum gap time is identified as $T_{Gap}$ 920 in FIG. 9B. $T_{Gap}$ may be predefined and may, for example, be equal to 2 symbols for $\mu=0$ or 1, 4 symbols for $\mu=2$ or 3, undefined for $\mu=4$, 16 symbols for $\mu=5$, and 32 symbols for $\mu=6$.

To allow for frequency offsets between UEs, a guard band (e.g., 0 or 1 PRB) may be configured between frequency division multiplexed POs (not shown).

To allow for different UE arrival times, a guard period (at the symbol level) may be configured between time division multiplexed POs (not shown).

As described above, a scheduling entity (e.g., a base station, a gNB) may schedule ROs and POs on different beams of a plurality of beams of the scheduling entity. Therefore, the scheduling entity may be on a first beam during an RO and/or PO associated with one scheduled entity at one moment and switch to a second beam during a different RO and/or PO associated with a second scheduled entity at the next moment. According to some examples, a scheduling entity needs time to switch between beams, and this time is referred to as a beam switching gap time herein. Presently, the PRACH and PUSCH cyclic prefix times (e.g., durations) are long enough to account for the beam switching gap time between ROs and POs associated with different beams; therefore, explicit beam switching gap accounting times may not be currently specified. However, as SCS increases, the symbol time ($T_{symb}$) and cyclic prefix time ($T_{CP}$) decrease proportionally, as shown in Table II below:

TABLE II

| Cyclic Prefix Time Versus Subcarrier Spacing and Symbol Time | | | | | | | |
|---|---|---|---|---|---|---|---|
| μ | 0 | 1 | 2 | 3 | 4 | 5 | 6 |
| SCS (kHz) | 15 | 30 | 60 | 120 | 240 | 480 | 960 |
| $T_{CP}$ (ns) | 4687.5 | 2343.8 | 1171.9 | 585.9 | 293.0 | 146.5 | 73.2 |
| $T_{symb}$ (ns) | 66666.7 | 33333.3 | 16666.7 | 8333.3 | 4166.7 | 2083.3 | 1041.7 |

Beam switching gap time overhead is not trivial for higher bands, such as in FR2. In some examples, a maximum beam switching gap time may be approximately 100 ns. Several combinations of μ and SCS, as exemplified in Table II, may correspond to cyclic prefix times, $T_{CP}$, which are not long enough to absorb an exemplary maximum beam switching gap time of approximately 100 ns.

For example, for a numerology $\mu=5$ with SCS of 480 kHz, the $T_{CP}$ is 146.5 ns, the difference between the cyclic prefix time and the exemplary maximum beam switching gap time of 100 ns (where difference=cyclic prefix time−maximum beam switching gap time) is equal to 46.5 ns. If a 50 ns margin between the cyclic prefix time and the maximum beam switching gap time was desired, for example, then the margin would not be satisfied for this example (e.g., the difference between cyclic prefix time and maximum beam switching gap time is less than 50 ns). By way of another example, for a numerology $\mu=6$ with SCS of 960 kHz, the $T_{CP}$ is 73.2 ns, the difference between the cyclic prefix time and the exemplary maximum beam switching gap time of 100 ns is equal to −26.8 ns (i.e., the $T_{CP}$ is 26.8 ns faster, or 26.8 ns less than the maximum beam switching gap time).

As the cyclic prefix time approaches and becomes less than the maximum beam switching gap time, adjacent ROs and/or POs may overlap in time. The overlap may cause interference and/or loss of messaging resulting in one or both of the ROs (or POs) becoming unusable. If a given margin between the cyclic prefix time and the maximum beam switching gap time is desired, then the given margin (e.g., 50 ns) may be set as a threshold value, and a processing circuit may determine if the difference between the cyclic prefix time and the maximum beam switching gap time is less than the threshold (e.g., less than the given margin, less than 50 ns). As indicated above, if the given margin is not obtained, at least some messaging may be lost.

In some examples, one symbol may be added as a guard time between beam switching operations. For the μ=5 and 6 cases mentioned above, adding a symbol would add 2083.3 ns and 1041.7 ns guard times, respectively, which is well more than even about a 200 ns margin between the cyclic prefix times of the μ=5 and 6 cases and the exemplary maximum beam switching gap time of 100 ns. However, the addition of the symbol may be wasteful of resources.

The current msgA design is such that ROs are grouped together, and POs are grouped together. Therefore, beam switching gap times may be introduced within the RO group and again within the PO group. These duplications cumulatively increase the beam switching gap times and reduce resource utilization. Aspects described herein may reduce this effect.

Figure 10:
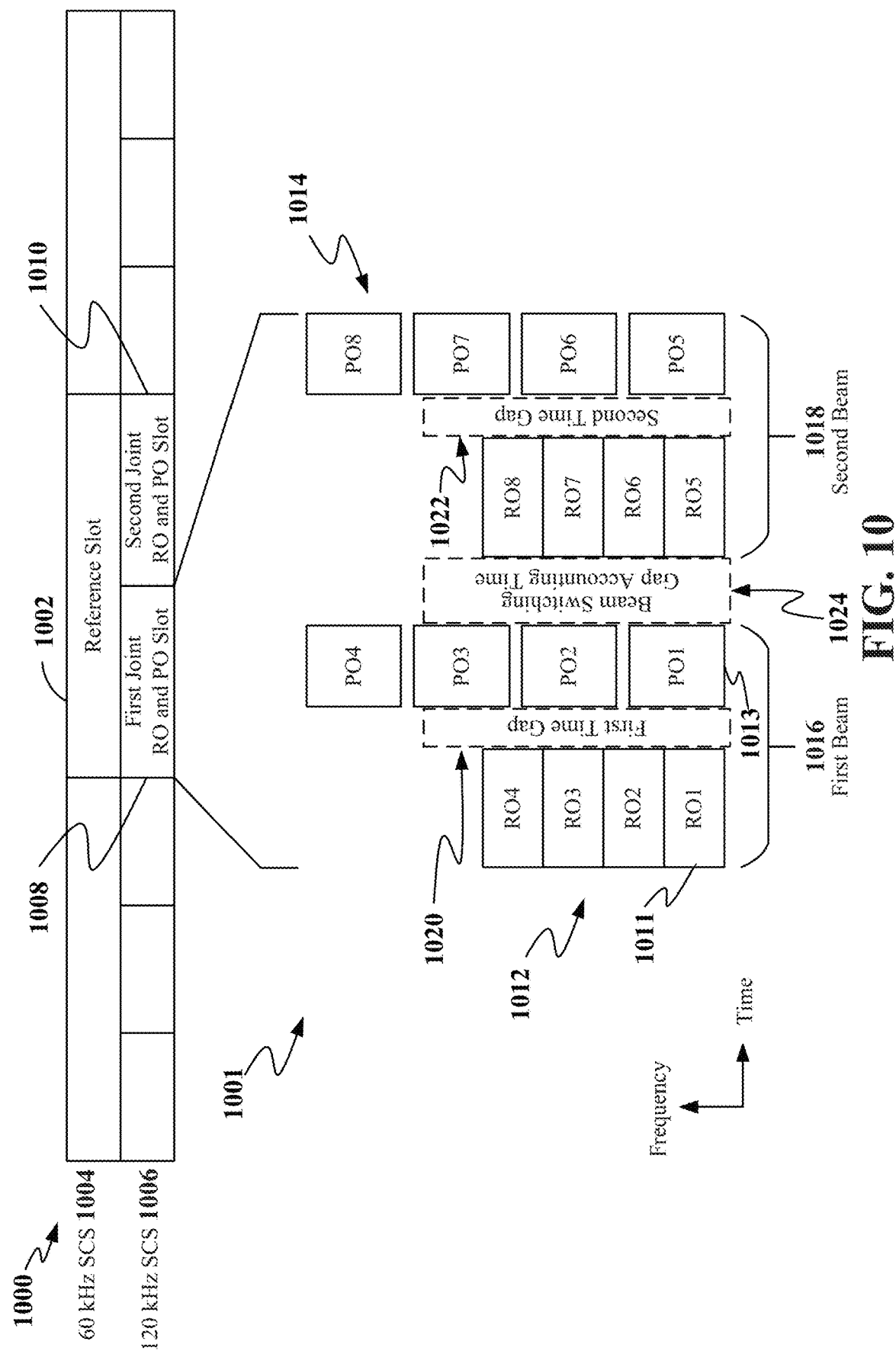
FIG. 10 is a diagram illustrating a portion of a time-frequency resource grid according to some aspects of the disclosure.

It has been observed that resources may be wasted if ROs and POs of the same beam (e.g., associated with the same SSB) are not consecutive in time (e.g., as in cases where an antenna beam is switched between an RO and a PO. According to some aspects of the disclosure, for msgA in a type-2 RACH procedure (2-step RACH procedure), a joint RO and PO slot, such as that shown in FIG. 10 (e.g., first joint RO and PO slots 1008 and/or second joint RO and PO slot 1010) may be defined where ROs and POs of the same beam (e.g., associated with the same SSB) are consecutive in time. The groupings of ROs and POs, as shown in FIG. 10, may be implemented using the same RO-to-PO mapping techniques presently in use; however, other techniques are within the scope of the disclosure. For example, a scheduling entity may map the at least the first RO (e.g., RO1 1011) to the at least the first PO (e.g., PO1 1013) based on a commonality of a scheduled entity identifier in each of a received PRACH preamble in the at least the first RO and a received PUSCH preamble in the at least the first PO.

FIG. 10 is a diagram illustrating a portion of a time-frequency resource grid 1000 according to some aspects of the disclosure. Here, time is in the horizontal direction with units of OFDM symbols, and frequency is in the vertical direction with units of subcarriers of the carrier. The relative orientations in both time and frequency of the various ROs and POs of FIG. 10 are provided for ease of illustration and are not limiting. FIG. 10 depicts a Reference slot 1002 among a plurality of 60 kHz SCS slots 1004. In the example of FIG. 10, the Reference slot 1002 may be defined corresponding to a given 60 kHz SCS slot number. There may be more than one (e.g., 2, 4, 8, 10, etc.) Reference slot 1002 in a given radio frame (e.g., a radio frame with 60 kHz SCS includes 40 slots). In some examples, a table (e.g., in a standard) that cross-references PRACH preamble configuration index values to the quantity and slot numbers of Reference slots per radio frame may exist. The radio frame repeats every slot configuration period. Consequently, there can be one or more Reference slots in every slot configuration period.

FIG. 10 depicts two joint RO and PO slots: a first joint RO and PO slot 1008 and a second joint RO and PO slot 1010. The first joint RO and PO slot 1008 and the second joint RO and PO slot 1010 are two slots among a plurality of 120 kHz SCS slots 1006. The first joint RO and PO slot 1008 and the second joint RO and PO slot 1010 are within (e.g., coincide with or correspond to) the 60 kHz Reference slot 1002. According to some examples, at least one joint RO and PO slot 1010 may be within the Reference slot 1002; in other words, a Reference slot (e.g., a 60 kHz SCS slot 1004 Reference slot 1002) may coincide with one or more joint RO and PO slots (e.g., one or more joint RO and PO 120 kHz, 240 kHz, 480 kHz, or 960 kHz SCS slots). Accordingly, one or more joint RO and PO slots may be included in a radio frame (not shown). The one or more joint RO and PO slots may be repeated every slot configuration period.

An expanded view 1001 of the first joint RO and PO slot 1008 is provided for purposes of example and description and is not limiting. As depicted, each joint RO and PO slot may include one or more PRACH-PUSCH resource pairs. The PRACH-PUSCH resource pairs may form sets of PRACH-PUSCH resource pairs. For example, a first set 1012 of PRACH-PUSCH resource pairs and a second set 1014 of PRACH-PUSCH resource pairs are depicted in the first joint RO and PO slot 1008.

The first set 1012 and the second set 1014 of four PRACH-PUSCH resource pairs are illustrated in the expanded view 1001 of the first joint RO and PO slot 1008 of FIG. 10. The value of four is used for exemplary purposes and is non-limiting. The first set 1012 of PRACH-PUSCH resource pairs (e.g., pairs of ROs and POs) includes four RACH occasions (RO1-RO4) and their corresponding PUSCH occasions (PO1-PO4). The four RACH occasions (RO1-RO4) and their corresponding PUSCH occasions (PO1-PO4) may correspond to a first beam 1016 of a plurality of beams of the scheduling entity. By way of example, at least a first RO (e.g., RO1 1011) and at least a first PO (e.g., PO1 1013) may correspond to each other and may correspond to a first beam 1016 of a plurality of beams of the scheduling entity. The first beam 1016 may be associated with a first SSB. The second set 1014 of PRACH-PUSCH resource pairs includes four RACH occasions (RO5-RO8) and their corresponding PUSCH occasions (PO5-PO8). The four RACH occasions (RO5-RO8) and their corresponding PUSCH occasions (PO5-PO8) may correspond to a second beam 1018 of the plurality of beams of the scheduling entity. The second beam 1018 may be associated with a second SSB. The term RO and PO combination may be used herein to refer to one or more pairs of respective ROs and corresponding respective POs.

A scheduling entity may schedule a time gap (e.g., first time gap 1020) between at least a first RO (e.g., RO1 1011) and at least a first PO (e.g., PO1 1013). The first time gap 1020 and the second time gap 1022 may be optional. According to some aspects, as shown, the first set 1012 of PRACH-PUSCH resource pairs (the RO1-PO1, RO2-PO2, RO3-PO3, and RO4-PO4 combinations) share the first time gap 1020 between them. However, it is within the scope of the disclosure to have two or more of the PRACH-PUSCH resource pairs in a given set of PRACH-PUSCH resource pairs (e.g., the first set 1012 of PRACH-PUSCH resource pairs) have the same or different time gaps (including zero time gaps) between them. For example, the RO1-PO1 combination may have no time gap (not shown), the RO2-PO2 and RO3-PO3 combinations may have a time gap of a first duration, and the RO4-PO4 combination may have a time gap of a second duration (not shown). According to some aspects, a time gap may have a duration of less than the symbol time ($T_{symb}$) of one time domain symbol; however other durations are within the scope of the disclosure. Examples of $T_{symb}$ are provided in Table II. The time gaps may facilitate a 2-step RACH procedure, for example.

According to one aspect, scheduled entities (e.g., UEs) may select a PRACH-PUSCH resource pair (e.g., a given RO and PO combination) based, at least in part, on the time gap (e.g., first time gap 1020, second time gap 1022) associated with the selected PRACH-PUSCH resource pair. Different times gaps may be related to different capabilities. For example, a scheduled entity may select a PRACH-PUSCH resource pair associated with the first time gap 1020 because the first time gap 1020 may be equal to or greater than a minimum time gap (e.g., one or more time domain symbols, as shown in Table II) needed based on the scheduled entity's capability. For example, a low or reduced capability scheduled entity may need a particular time gap between PRACH and PUSCH transmissions. In that case, the low or reduced capability scheduled entity may choose from among the various RO-PO combinations of PRACH-PUSCH resource pairs (e.g., RO1-PO1, RO2-PO2, etc.) that provide various respective time gaps. In some examples, a high capability scheduled entity may support no time gap or a time gap of less than one time domain symbol between PRACH and PUSCH transmissions.

According to another aspect, the first time gap 1020 and the second time gap 1022 may accommodate SCS changes and/or bandwidth (BW) changes. For example, in the non-limiting illustration of FIG. 10, the bandwidths of RO1-RO4 are different from the bandwidths of the respective PO1-PO4 and the bandwidths of RO5-RO8 are different from the bandwidths of the respective PO5-PO8.

FIG. 10 provides one non-limiting example of how, according to aspects described herein, only N−1 beam switching gap accounting times are used between combined ROs/POs of different beams, where N is the number of beams. In current NR systems, given a use of N beams, there are N−1 beam switching gaps between the ROs (on the N different beams) and an additional N−1 beam switching gaps between the POs (on the N different beams). Accordingly, there are a total of 2(N−1) beam switching gaps. Setting aside the exemplary and optional first time gap 1020 and second time gap 1022 of FIG. 10 (which may represent times used to account for SCS changes and/or bandwidth changes in contrast to times used to account for beam switching gap times), according to aspects described herein and as shown in FIG. 10 only N−1 gaps are utilized between combined ROs/POs associated with N different beams. For example, as shown in FIG. 10 for two beams (N=2), a beam switching gap accounting time 1024 is shown between RO1-RO4/PO1-PO4 on the first beam 1016 and RO5-RO8/PO5-PO8 on the second beam 1018. Accordingly, and as shown in FIG. 10, only N−1 beam switching gaps are used between the combined ROs/POs of N different beams.

The beam switching gap accounting time 1024 is shown between the first set 1012 of PRACH-PUSCH resource pairs and the second set 1014 of PRACH-PUSCH resource pairs. According to some aspects, the beam switching gap accounting time 1024 between the first set 1012 of PRACH-PUSCH resources associated with the first beam 1016 and the second set 1014 of PRACH-PUSCH resources associated with the second beam 1018 may be used to avoid losing information during a beam switching operation in response to a use of a cyclic prefix time that that may be approximately equal to or less than a maximum beam switching gap time (e.g., a maximum time used by the scheduling entity to switch between the first beam 1016 and the second beam 1018).

In one example, a scheduling entity may be in the process of switching between the first beam 1016 conveying the first set 1012 of PRACH-PUSCH resource pairs and the second beam 1018 conveying the second set 1014 of PRACH-PUSCH resource pairs. Portions of messages received may be lost due to certain cyclic prefix times being approximately equal to or less than the maximum beam switching gap time. According to aspects herein, a given margin between the cyclic prefix time and the maximum beam switching gap time may be obtained by setting the given margin (e.g., a value equal to the given margin or equal to the given margin plus or minus about 10, about 100, or about 500 ns) as a threshold value. A scheduling entity may set the beam switching gap accounting time 1024 in response to determining that the difference between the cyclic prefix time and the maximum beam switching gap time is less than the threshold. For example, the beam switching gap accounting time 1024 may be set to a value such that the beam switching gap accounting time 1024 plus the cyclic prefix time is greater than the maximum beam switching gap time and less than one symbol of the joint RO and PO slot 1008. Setting the beam switching gap accounting time 1024 as just described may avoid wasting resources in comparison to the resources used if an alternative (such as inserting one or more symbols between the first set 1012 of PRACH-PUSCH resources and the second set 1014 of PRACH-PUSCH resources) was used to avoid, for example, losing information in response to a cyclic prefix time being on the order of and/or less than the maximum beam switching gap time.

The beam switching gap accounting time 1024 may be a settable/configurable time (e.g., in ns) used to account for beam switching gap time. The beam switching gap accounting time 1024 may be optional. The beam switching gap accounting time 1024 may be the same in the first joint RO and PO slot 1008 and the second joint RO and PO, or it may be different. Accordingly, in one example (not shown), no beam switching gap accounting time 1024 may be included between one or more PRACH-PUSCH resource pairs (associated with different antenna beams) or between one or more sets of PRACH-PUSCH resource pairs (associated with different antenna beams), while the same (non-zero) or different (non-zero) beam switching gap accounting times may be included between other PRACH-PUSCH resource pairs (associated with different antenna beams) and/or other sets of PRACH-PUSCH resource pairs (associated with different antenna beams) (not shown).

The beam switching gap accounting time 1024 may be at least one of: predefined, or configured. If configured, the beam switching gap accounting time 1024 may be configured at least one of: semi-statically, or dynamically. The beam switching gap accounting time 1024 may be transmitted from the scheduling entity to a scheduled entity.

According to some aspects, as shown in the example of FIG. 10, more than one RO and PO pair (e.g., an RO and a corresponding PO, an RO and PO combination, RO1 1011 and PO1 1013) may be defined in a joint RO and PO slot. According to some aspects, a joint RO and PO slot may be configured to span one or more system slots (e.g., one or more 960 kHz SCS slots). For example, the joint RO and PO slot may correspond to a plurality of contiguous slots that collectively include a plurality of RO and PO combinations scheduled consecutively in time. Therefore, a reference to a joint slot herein may be considered as a reference to contiguous slots that include respective sets of RO and PO combinations separated in time by a beam switching gap accounting time(s) where each of the respective sets of RO and PO combinations is associated with a respective (SSB) antenna beam.

In one example, a set of joint RO and PO slots may repeat every configuration period (e.g., every joint RO and PO slot configuration period). In another example, an association period may be defined as a minimum number of joint RO and PO slot configuration periods such that all SSB beams are mapped into ROs. In another example, a frequency guard band may be defined or configured between POs of a joint RO and PO slot to allow for differences in UE frequency offsets. Accordingly, joint RO and PO slots may increase efficiency by grouping sets of ROs and POs of the same beam (associated with the same SSB) in consecutive time order.

Figure 11:
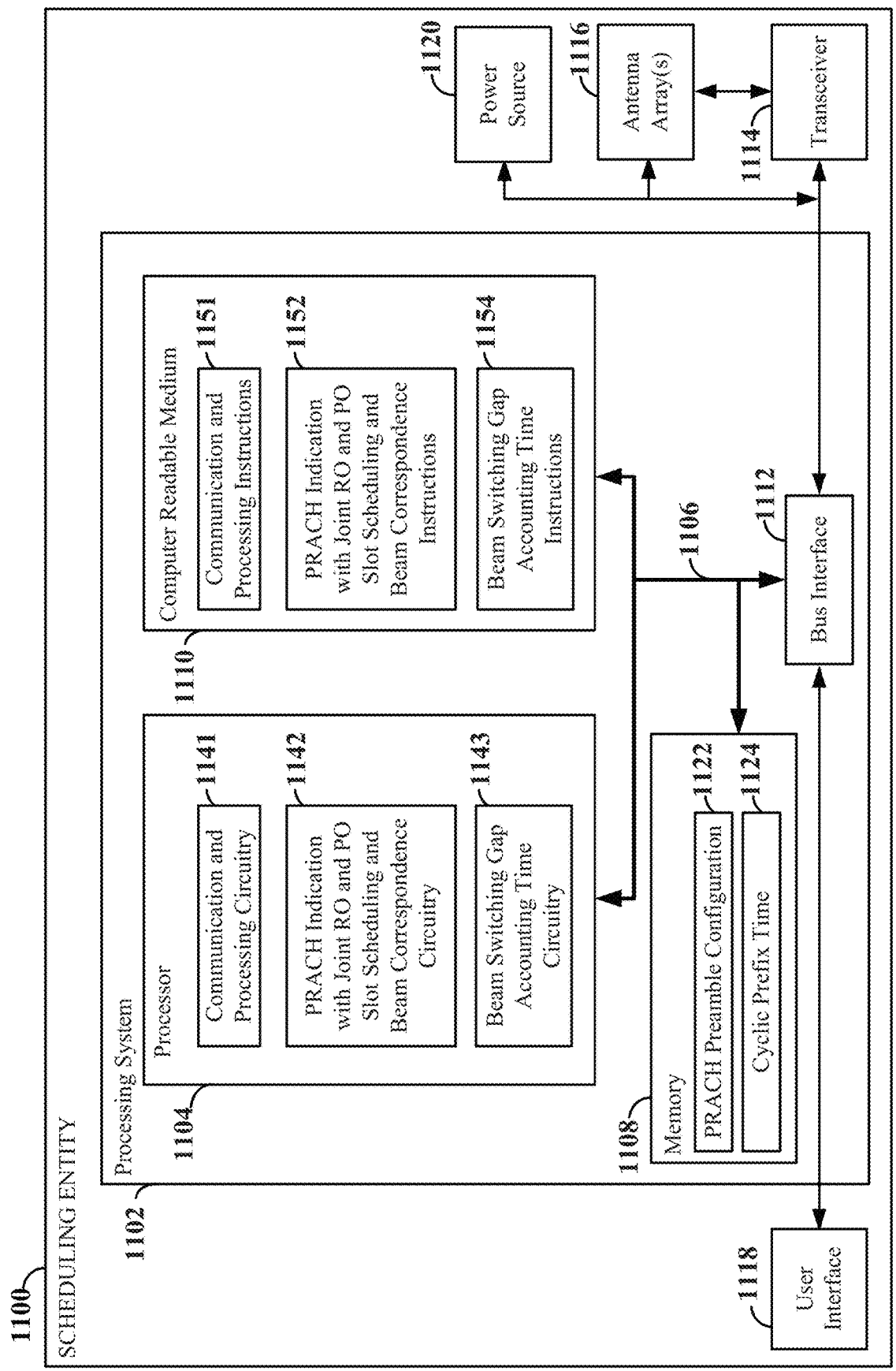
FIG. 11 is a block diagram illustrating an example of a hardware implementation of a scheduling entity employing a processing system according to some aspects of the disclosure.

FIG. 11 is a block diagram illustrating an example of a hardware implementation of a scheduling entity 1100 employing a processing system 1102 according to some aspects of the disclosure. The scheduling entity 1100 may be, for example, a base station, an eNB, a gNB, or a network access node as illustrated in any one or more of FIGS. 1, 2, 4, and/or 5.

In accordance with various aspects of the disclosure, an element, or any portion of an element, or any combination of elements may be implemented with a processing system 1102 that includes one or more processors, such as processor 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in the scheduling entity 1100, may be used to implement any one or more of the methods or processes described and illustrated, for example, in FIGS. 12 and/or 13.

The processor 1104 may in some examples be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1102 may be implemented with a bus architecture, represented generally by the bus 1106. The bus 1106 may include any number of interconnecting buses and bridges depending on the specific application of the processing system 1102 and the overall design constraints. The bus 1106 communicatively couples together various circuits, including one or more processors (represented generally by the processor 1104), a memory 1108, and computer-readable media (represented generally by the computer-readable medium 1110). The bus 1106 may also link various other circuits such as timing sources, peripherals, voltage regulators, and power management circuits, which are well known in the art, and therefore, will not be described any further.

A bus interface 1112 provides an interface between the bus 1106 and a transceiver 1114. The transceiver 1114 may be a wireless transceiver. The transceiver 1114 may provide a means for communicating with various other apparatus over a transmission medium (e.g., air interface). The transceiver 1114 may further be coupled to one or more antenna arrays (hereinafter antenna array 1116). In some examples, the transceiver 1114 and the antenna array 1116 may be configured to transmit and receive using directional beamforming (e.g., using a single beam or a beam pair link (BPL) on each of the uplink and downlink transmissions). The bus interface 1112 further provides an interface between the bus 1106 and a user interface 1118 (e.g., keypad, display, touch screen, speaker, microphone, control features, etc.). Of course, such a user interface 1118 is optional and may be omitted in some examples. In addition, the bus interface 1112 further provides an interface between the bus 1106 and a power source 1120 of the scheduling entity 1100.

The processor 1104 is responsible for managing the bus 1106 and general processing, including the execution of software stored on the computer-readable medium 1110. The software, when executed by the processor 1104, causes the processing system 1102 to perform the various functions described below for any particular apparatus. The computer-readable medium 1110 and the memory 1108 may also be used for storing data that is manipulated by the processor 1104 when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1110. When executed by the processor 1104, the software may cause the processing system 1102 to perform the various processes and functions described herein for any particular apparatus.

The computer-readable medium 1110 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1110 may reside in the processing system 1102, external to the processing system 1102, or distributed across multiple entities including the processing system 1102. The computer-readable medium 1110 may be embodied in a computer program product or article of manufacture. By way of example, a computer program product or article of manufacture may include a computer-readable medium in packaging materials. In some examples, the computer-readable medium 1110 may be part of the memory 1108. Those skilled in the art will recognize how best to implement the described functionality presented throughout this disclosure depending on the particular application and the overall design constraints imposed on the overall system.

In some aspects of the disclosure, the processor 1104 may include communication and processing circuitry 1141 configured for various functions, including, for example, communicating with a scheduled entity (e.g., a wireless communication device, a UE), a network core (e.g., a 5G core network), other scheduling entities, or any other entity, such as, for example, local infrastructure or an entity communicating with the scheduling entity 1100 via the Internet, such as a network provider. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1141 may include one or more transmit/receive chains.

In some implementations where the communication involves receiving information, the communication and processing circuitry 1141 may obtain or identify information from a component of the scheduling entity 1100 (e.g., from the transceiver 1114 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1108, or to the bus interface 1112. In some examples, the communication and processing circuitry 1141 may receive one or more of: signals, messages, other information, or any combination thereof. In some examples, the communication and processing circuitry 1141 may receive information via one or more channels. In some examples, the communication and processing circuitry 1141 may include functionality for a means for receiving. In some examples, the communication and processing circuitry 1141 may include functionality for a means for processing, including a means for demodulating, a means for decoding, etc.

In some implementations where the communication involves sending (e.g., transmitting) information, the communication and processing circuitry 1141 may obtain or identify information (e.g., from another component of the processor 1104, the memory 1108, or the bus interface 1112), process (e.g., modulate, encode, etc.) the information, and output the processed information. For example, the communication and processing circuitry 1141 may output the information to the transceiver 1114 (e.g., that transmits the information via radio frequency signaling or some other type of signaling suitable for the applicable communication medium). In some examples, the communication and processing circuitry 1141 may send one or more of: signals, messages, other information, or any combination thereof. In some examples, the communication and processing circuitry 1141 may send information via one or more channels. In some examples, the communication and processing circuitry 1141 may include functionality for a means for sending (e.g., a means for transmitting). In some examples, the communication and processing circuitry 1141 may include functionality for a means for generating, including a means for modulating, a means for encoding, etc. In some examples, the communication and processing circuitry 1141 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) via the antenna array 1116 and the transceiver 1114.

In some examples, the communication and processing circuitry 1141 may further be configured to map, in at least one joint RO and PO slot, at least a first RO to at least a first PO based on a commonality of a scheduled entity identifier in each of a received PRACH preamble in the at least the first RO and a received PUSCH preamble in the at least the first PO. The communication and processing circuitry 1141 may further be configured to schedule a time gap, based on a level of capability of a scheduled entity, between the at least the first RO and the at least the first PO. The communication and processing circuitry 1141 may further be configured to set a guard time between the at least the first RO and the at least the first PO. The communication and processing circuitry 1141 may also be configured to repeat the at least one joint RO and PO slot in accordance with a predefined joint RO and PO configuration period.

Some resource configurations may also include at least a third RO and at least a third PO within the at least one joint RO and PO slot, the at least the third RO and the at least the third PO: corresponding to the first beam of the plurality of beams of the scheduling entity, and corresponding to respective symbols of the at least the first RO and the at least the first PO. In such resource configurations, the communication and processing circuitry 1141 may further be configured to set a frequency guard period between the at least the first PO and the at least the third PO in the joint RO and PO slot. In some examples, the communications and processing circuitry 1141 may set a frequency guard period between any two POs (and/or ROs) in a set of PRACH-PUSCH resources in the joint RO and PO slot.

In some examples, the communication and processing circuitry 1141 may include one or more hardware components that provide the physical structure that performs processes related to, for example, mapping, in at least one joint RO and PO slot, at least a first RO to at least a first PO based on a commonality of a scheduled entity identifier in each of a received PRACH preamble in the at least the first RO and a received PUSCH preamble in the at least the first PO. The one or more hardware components may also provide the physical structure that performs processes related to, for example, scheduling a time gap, based on a level of capability of a scheduled entity, between the at least the first RO and the at least the first PO, setting a guard time between the at least the first RO and the at least the first PO, repeating the at least one joint RO and PO slot in accordance with a predefined joint RO and PO configuration period, setting a frequency guard period between the at least the first PO and the at least the third PO in the joint RO and PO slot, and/or setting a frequency guard period between any two POs (and/or ROs) in a set of PRACH-PUSCH resources in the joint RO and PO slot. The communication and processing circuitry 1141 may further be configured to execute communication and processing software 1151 stored on the computer-readable medium 1110 to implement one or more functions described herein.

In some aspects of the disclosure, the processor 1104 may include PRACH indication with joint RO and PO slot scheduling and beam correspondence circuitry 1142 configured for various functions, including, for example, obtaining, scheduling, and/or transmitting a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of the scheduling entity. In some examples, the joint RO and PO slot may correspond to a plurality of contiguous slots that collectively include a plurality of RO and PO combinations scheduled consecutively in time. The joint RO and PO slot may span a plurality of PRACH slots in some examples. In some examples, the at least the first RO and the at least the first PO may be a first RO and PO combination, and the PRACH indication may further indicate resources of at least a second RO and at least a second PO within the at least one joint RO and PO slot. In such examples, the at least the second RO and the at least the second PO: may be a second RO and PO combination that may correspond to a second beam of the plurality of beams of the scheduling entity, the second beam being different from the first beam. The second RO and PO combination may be spaced apart in time from the first RO and PO combination.

In some examples, the PRACH indication with joint RO and PO slot scheduling and beam correspondence circuitry 1142 may include one or more hardware components that alone, or in combination with other circuits, including, for example, the transceiver 1114, the antenna array(s) 1116, and/or the memory 1108, may provide the physical structure that performs processes related to obtaining, scheduling, and/or transmitting a PRACH indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of the scheduling entity. In the examples where the at least the first RO and the at least the first PO are a first RO and PO combination, and the PRACH indication may further indicates resources of at least a second RO and at least a second PO within the at least one joint RO and PO slot, the PRACH indication with joint RO and PO slot scheduling and beam correspondence circuitry 1142, alone, or in combination with the other circuits, such as the transceiver 1114, the antenna array(s) 1116, and/or the memory 1108, may provide the physical structure that performs processes related to obtaining, scheduling, and/or transmitting the PRACH indication that may further indicate resources of the at least the second RO and the at least the second PO, where the at least the second RO and the at least the second PO: may be a second RO and PO combination, may correspond to a second beam of the plurality of beams of the scheduling entity, the second beam being different from the first beam, and may be spaced apart in time from the first RO and PO combination. By way of example, the memory 1108 of the processing system 1102 may store a PRACH preamble configuration table 1122 that may cross-reference PRACH preamble configuration index values to the quantity and slot numbers of Reference slots per radio frame, and to PRACH preamble formats, among other information. The PRACH preamble configuration may be included in the PRACH indication. The PRACH indication with joint RO and PO slot scheduling and beam correspondence circuitry 1142 may further be configured to execute PRACH indication with joint RO and PO slot scheduling and beam correspondence software 1152 stored on the computer-readable medium 1110 to implement one or more functions described herein.

In some aspects of the disclosure, the processor 1104 may include beam switching gap accounting time circuitry 1143 configured for various functions, including, for example, obtaining a maximum beam switching gap time corresponding to a maximum amount of time used by the scheduling entity to switch between the first beam and the second beam, obtaining a cyclic prefix time corresponding to a message associated with the at least the second RO, and scheduling a beam switching gap accounting time between the first RO and PO combination and the second RO and PO combination in response to a difference between the cyclic prefix time and the maximum beam switching gap time being less than a threshold. The closer the beam switching gap time is to the cyclic prefix time (e.g., the closer the difference is to the threshold), the less time there is for the scheduling entity to absorb the beam switching gap time realized when switching between respective beams associated with at least the first RO and PO combination and the at least second RO and PO combination.

In one example, in response to the difference between the cyclic prefix time and the maximum beam switching gap time (e.g., where the difference is equal to cyclic prefix time—maximum beam switching gap time) being less than the threshold, the scheduling entity may add a beam switching gap accounting time between the RO and PO pair(s) associated with a first beam and the RO and PO pair(s) associated with a second beam, different from the first beam. According to some examples, the beam switching gap accounting time plus the cyclic prefix time may be greater than the maximum beam switching gap time and less than a duration of one symbol of the joint RO and PO slot. According to some aspects, the beam switching gap accounting time circuitry 1143, in connection with, for example, the transceiver 1114, the antenna array(s) 1116, and the memory 1108, may transmit an indication of the beam switching gap accounting time at least one of: semi-statically, or dynamically. In some examples, the cyclic prefix time may be stored, for example, in a cyclic prefix time table 1124 in the memory 1108 of the processing system 1102.

In some examples, the beam switching gap accounting time circuitry 1143 may perform additional functions, including, for example, in examples where the at least the first RO and the at least the first PO are a first RO and PO combination, transmitting the PRACH indication with an additional indication of resources of at least a second RO and at least a second PO within the at least one joint RO and PO slot. The at least the second RO and the at least the second PO may be a second RO and PO combination, and the at least the second RO and the at least the second PO may correspond to a second beam of the plurality of beams of the scheduling entity, the second beam being different from the first beam. In such examples, the beam switching gap accounting time circuitry 1143 may perform an additional function of, for example, setting a beam switching gap accounting time between the first RO and PO combination and the second RO and PO combination. According to some aspects, the beam switching gap accounting time may be transmitted at least one of: semi-statically, or dynamically.

In some examples, the beam switching gap accounting time circuitry 1143 may include one or more hardware components that alone, or in combination with other circuits, such as, for example, the communication and processing circuitry 1141, the transceiver 1114, the antenna array(s) 1116, and/or the memory 1108, may provide the physical structure that performs processes related to obtaining a maximum beam switching gap time corresponding to a maximum amount of time used by the scheduling entity to switch between the first beam and the second beam, obtaining a cyclic prefix time corresponding to a message associated with the at least the second RO, and scheduling a beam switching gap accounting time between the first RO and PO combination and the second RO and PO combination in response to a difference between the cyclic prefix time and the maximum beam switching gap time being less than a threshold. In some examples, the one or more hardware components that alone, or in combination with other circuits, such as, for example, the communication and processing circuitry 1141, the transceiver 1114, the antenna array(s) 1116, and/or the memory 1108, may, in response to the difference between the cyclic prefix time and the maximum beam switching gap time being less than the threshold, add a beam switching gap accounting time between the RO and PO pair(s) associated with a first beam and the RO and PO pair(s) associated with a second beam, different from the first beam. In such examples, the beam switching gap accounting time plus the cyclic prefix time may be greater than the maximum beam switching gap time and less than a duration of one symbol of the joint RO and PO slot. According to some aspects, the one or more hardware components that alone, or in combination with other circuits, such as, for example, the communication and processing circuitry 1141, the transceiver 1114, the antenna array(s) 1116, and/or the memory 1108, may transmit an indication of the beam switching gap accounting time at least one of: semi-statically, or dynamically.

The beam switching gap accounting time circuitry 1143 may further be configured to execute beam switching gap accounting time software 1153 stored on the computer-readable medium 1110 to implement one or more functions described herein.

Figure 12:
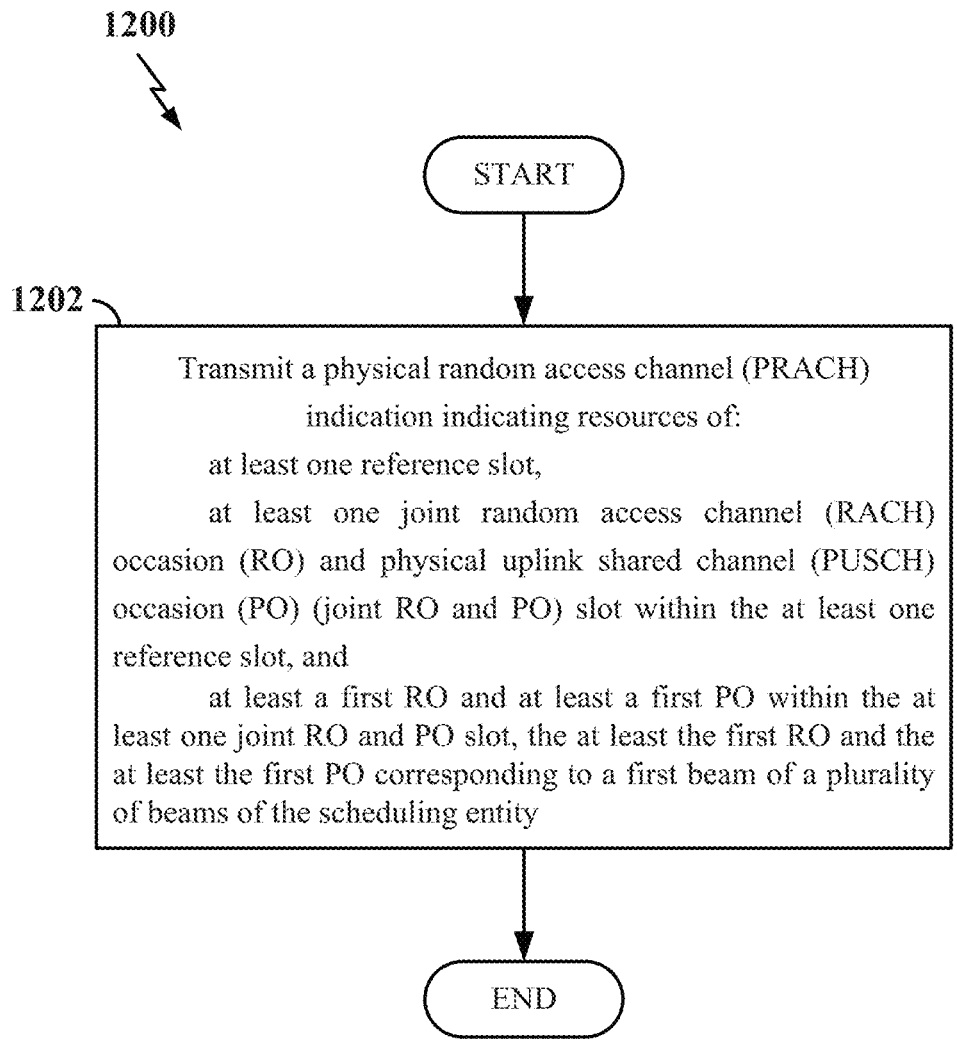
FIG. 12 is a flow chart illustrating an exemplary process at a scheduling entity according to some aspects of the disclosure.

FIG. 12 is a flow chart illustrating an exemplary process 1200 (e.g., a method of wireless communication) at a scheduling entity (e.g., a base station, a gNB) in a wireless communication network according to some aspects of the disclosure. As described below, some or all illustrated features may be omitted in a particular implementation within the scope of the present disclosure, and some illustrated features may not be required for all implementations. In some examples, the process 1200 may be carried out by the scheduling entity 1100 illustrated in FIG. 11. In some examples, the process 1200 may be carried out by any suitable apparatus or means for carrying out the functions or algorithms described herein.

At block 1202, the scheduling entity may transmit a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to a first beam of a plurality of beams of the scheduling entity. For example, the PRACH indication with joint RO and PO slot scheduling and beam correspondence circuitry 1142, shown and described above in connection with FIG. 11, in connection with, for example, the transceiver 1114, antenna array(s) 1116, and/or the memory 1108, shown and described above in connection with FIG. 11, may provide a means for transmitting a PRACH indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to a first beam of a plurality of beams of the scheduling entity.

In some aspects, the scheduling entity may map the at least the first RO to the at least the first PO based on a commonality of a scheduled entity identifier in each of a received PRACH preamble in the at least the first RO and a received PUSCH preamble in the at least the first PO. In some aspects, the scheduling entity may schedule a time gap, based on a level of capability of a scheduled entity, between the at least the first RO and the at least the first PO. For example, the communication and processing circuitry 1141, shown and described above in connection with FIG. 11, may provide a means for mapping the at least the first RO to the at least the first PO based on a commonality of a scheduled entity identifier in each of a received PRACH preamble in the at least the first RO and a received PUSCH preamble in the at least the first PO. The communication and processing circuitry 1141, shown and described above in connection with FIG. 11, may also provide a means for scheduling a time gap, based on a level of capability of a scheduled entity, between the at least the first RO and the at least the first PO.

As described above, there may be examples where the at least the first RO and the at least the first PO are a first RO and PO combination, and the PRACH indication may further indicate resources of at least a second RO and at least a second PO within the at least one joint RO and PO slot. By way of example, the PRACH indication with joint RO and PO slot scheduling and beam correspondence circuitry 1142, shown and described above in connection with FIG. 11, may provide a means for causing the PRACH indication to further indicate resources of at least a second RO and at least a second PO within the at least one joint RO and PO slot. As indicated above, the at least the second RO and the at least the second PO: may be a second RO and PO combination, may correspond to a second beam of the plurality of beams of the scheduling entity, the second beam being different from the first beam, and may be spaced apart in time from the first RO and PO combination. In such examples, the beam switching gap accounting time circuitry 1143 may provide a means for obtaining a maximum beam switching gap time corresponding to a maximum amount of time used by the scheduling entity to switch between the first beam and the second beam, a means for obtaining a cyclic prefix time corresponding to a message associated with the at least the second RO, and a means for scheduling a beam switching gap accounting time between the first RO and PO combination and the second RO and PO combination in response to a difference between the cyclic prefix time and the maximum beam switching gap time being less than a threshold. In some examples, the beam switching gap accounting time plus the cyclic prefix time may be greater than the maximum beam switching gap time and less than a duration of one symbol of the joint RO and PO slot.

In some examples, the beam switching gap accounting time circuitry 1143, the transceiver 1114, and the antenna array(s) 1116, shown and described above in connection with FIG. 11, may provide a means for transmitting an indication of the beam switching gap accounting time at least one of: semi-statically, or dynamically.

According to some aspects, the communication and processing circuitry 1141, shown and described above in connection with FIG. 11, may provide a means for repeating the at least one joint RO and PO slot in accordance with a predefined joint RO and PO configuration period. According to some aspects, the PRACH indication with joint RO and PO slot scheduling and beam correspondence circuitry 1142, shown and described above in connection with FIG. 11, may provide a means for causing the PRACH indication to further indicate resources of at least a third RO and at least a third PO within the at least one joint RO and PO slot. The at least the third RO and the at least the third PO may correspond to the first beam of the plurality of beams of the scheduling entity, and may correspond to respective symbols of the at least the first RO and the at least the first PO. In such examples, the PRACH indication with joint RO and PO slot scheduling and beam correspondence circuitry 1142, shown and described above in connection with FIG. 11, may also provide a means for setting a frequency guard period between the at least the first PO and the at least the third PO in the joint RO and PO slot.

Figure 13:
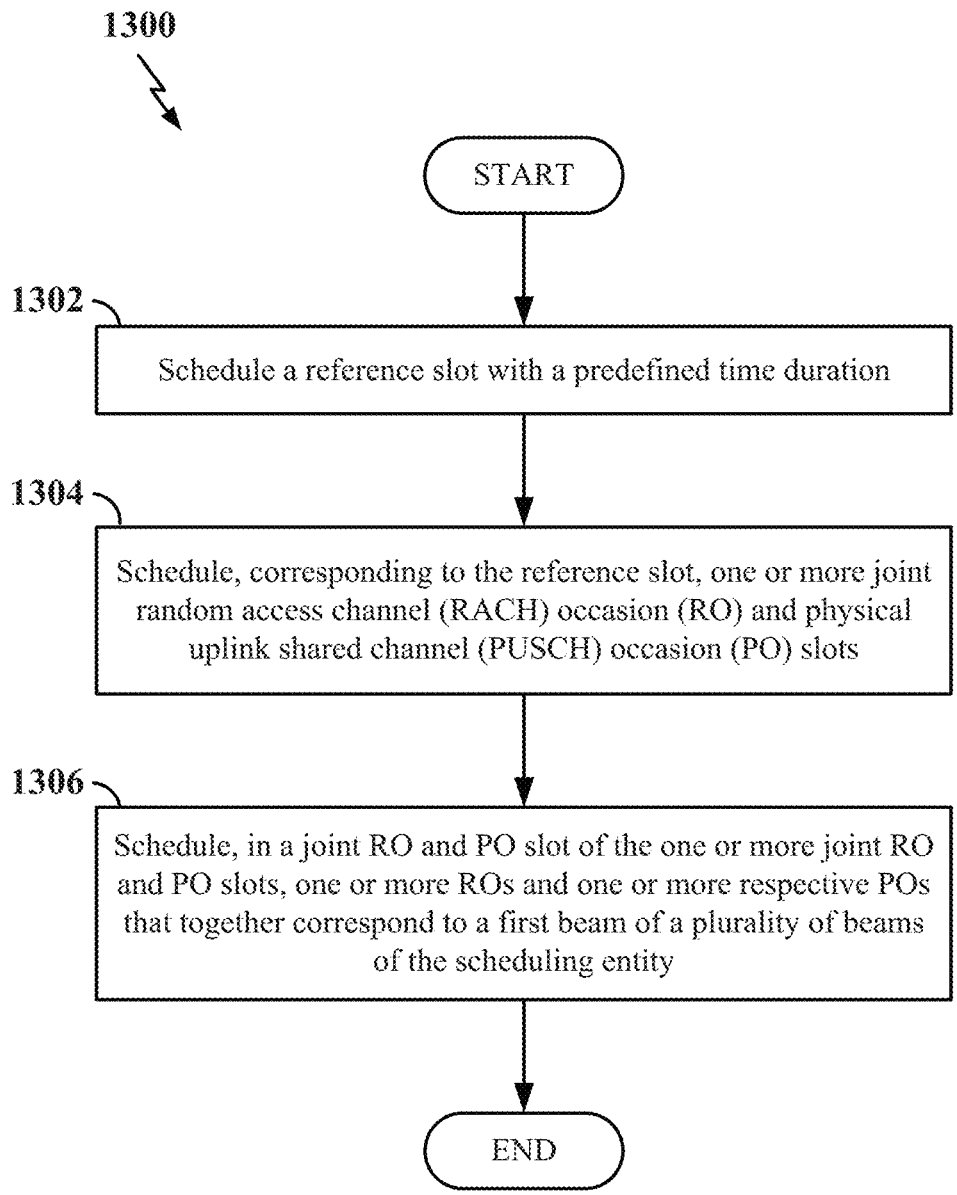
FIG. 13 is a flow chart illustrating an exemplary process at a scheduling entity according to some aspects of the disclosure.

FIG. 13 is a flow chart illustrating an exemplary process 1300 (e.g., a method of wireless communication) at a scheduling entity (e.g., a base station, a gNB) in a wireless communication network according to some aspects of the disclosure. As described below, some or all illustrated features may be omitted in a particular implementation within the scope of the present disclosure, and some illustrated features may not be required for all implementations. In some examples, the process 1300 may be carried out by the scheduling entity 1100 illustrated in FIG. 11. In some examples, the process 1300 may be carried out by any suitable apparatus or means for carrying out the functions or algorithms described herein.

At block 1302, the scheduling entity may schedule a reference slot with a predefined duration. For example, the PRACH indication with joint RO and PO slot scheduling and beam correspondence circuitry 1142, shown and described above in connection with FIG. 11, may provide means scheduling a reference slot with a predefined duration.

At block 1304, the scheduling entity may schedule, corresponding to the reference slot, one or more joint random access channel (RACH) occasion (RO) and physical uplink shared channel (PUSCH) occasion (PO) (joint RO and PO) slots. A joint RO and PO slot of the one or more joint RO and PO slots may be defined to span at least two of the one or more joint RO and PO slots. For example, the PRACH indication with joint RO and PO slot scheduling and beam correspondence circuitry 1142, shown and described above in connection with FIG. 11, may provide means for scheduling, corresponding to the reference slot, one or more joint RO and PO slots.

At block 1306, the scheduling entity may schedule, in a joint RO and PO slot of the one or more joint RO and PO slots, one or more ROs and one or more respective POs that together correspond to a first beam of a plurality of beams of the scheduling entity. According to some aspects, each of the plurality of beams, including the first beam, corresponds to a respective synchronization signal block (SSB). According to some aspects, the scheduling entity may map the one or more ROs to the one or more respective POs based on a commonality of a scheduled entity identifier in each of a received PRACH preamble in the one or more ROs and a received PUSCH preamble in the one or more respective POs. According to some aspects, the scheduling entity may also identify a maximum beam switching gap accounting time and a cyclic prefix time, and schedule the one or more ROs and the one or more respective POs in the joint RO and PO slot based on whether a difference between the cyclic prefix time and the maximum beam switching gap accounting time is less than a predetermined threshold. According to other aspects, the scheduling entity may also schedule, in the joint RO and PO slot of the one or more joint RO and PO slots, a first RO-PO pair of the one or more ROs and the one or more respective POs that together correspond to the first beam of the plurality of beams of the scheduling entity and a second RO-PO pair of the one or more ROs and the one or more respective POs that together correspond to a second beam of a plurality of beams of the scheduling entity, different from the first beam, and set a beam switching gap accounting time between the first RO-PO pair and the second RO-PO pair.

According to some aspects, the beam switching gap accounting time may be at least one of: predefined, or configured (e.g., transmitted to a scheduled entity by a scheduling entity). According to some aspects, the beam switching gap accounting time may be configured (e.g., transmitted) at least one of: semi-persistently, or dynamically. According to some aspects, the scheduling entity may set a gap time between at least one corresponding pair of the one or more ROs and the respective POs corresponding to the first beam. According to some aspects, the scheduling entity may set a frequency guard period (GP) between any two of the one or more respective POs in the joint RO and PO slot of the one or more joint RO and PO slots. The setting may correct differences in at least one of: scheduled entity frequency offsets, or scheduled entity arrival times. The GP may be at least one of: defined, or configured. In some examples, the scheduling entity may repeat at least the joint RO and PO slot of the one or more joint RO and PO slots in accordance with a predefined joint RO and PO configuration period. An association period may be defined as a minimum number of the joint RO and PO configuration periods such that the plurality of beams of the scheduling entity are mapped into ROs.

For example, the PRACH indication with joint RO and PO slot scheduling and beam correspondence circuitry 1142 and/or beam switching gap accounting time circuitry 1143, shown and described above in connection with FIG. 11, may provide the means for scheduling, in the joint RO and PO slot of the one or more joint RO and PO slots, one or more ROs and one or more respective POs that together correspond to a first beam of a plurality of beams of the scheduling entity and the means for mapping the one or more ROs to the one or more respective POs based on a commonality of a scheduled entity identifier in each of a received PRACH preamble in the one or more ROs and a received PUSCH preamble in the one or more respective POs. The beam switching gap accounting time circuitry 1143 may also provide the means for identifying a maximum beam switching gap accounting time and a cyclic prefix time, and scheduling the one or more ROs and the one or more respective POs in the joint RO and PO slot based on a difference between the cyclic prefix time and the maximum beam switching gap accounting time being less than a threshold. The beam switching gap accounting time circuitry 1143 may also provide the means for scheduling in the joint RO and PO slot of the one or more joint RO and PO slots, a first RO-PO pair of the one or more ROs and the one or more respective POs that together correspond to the first beam of a plurality of beams of the scheduling entity and a second RO-PO pair of the one or more ROs and the one or more respective POs that together correspond to a second beam of a plurality of beams of the scheduling entity m, different from the first beam, and setting a beam switching gap accounting time between the first RO-PO pair and the second RO-PO pair. The beam switching gap accounting time circuitry 1143 may also provide the means for setting the gap time between at least one corresponding pair of the one or more ROs and the one or more respective POs that together correspond to the first beam.

The scheduling entity may schedule, consecutively in time, the one or more ROs and one or more respective POs in the joint RO and PO slot of the one or more joint RO and PO slots. For example, the PRACH indication with joint RO and PO scheduling and beam correspondence circuitry 1142, shown and described above in connection with FIG. 11, may provide the means for scheduling, consecutively in time, the one or more ROs and one or more respective POs in the joint RO and PO slot of the one or more joint RO and PO slots.

Of course, in the above examples, the circuitry included in the processor 1104 is merely provided as an example. Other means for carrying out the described functions may be included within various aspects of the present disclosure, including but not limited to the instructions stored in the computer-readable medium 1110 or any other suitable apparatus or means described in any one of the FIGS. 1, 2, 4, 5, and/or 11, and utilizing, for example, the processes and/or algorithms described herein in relation to FIGS. 4, 5, 6, 7, 8, 9, 10, 12, and/or 13.

Figure 14:
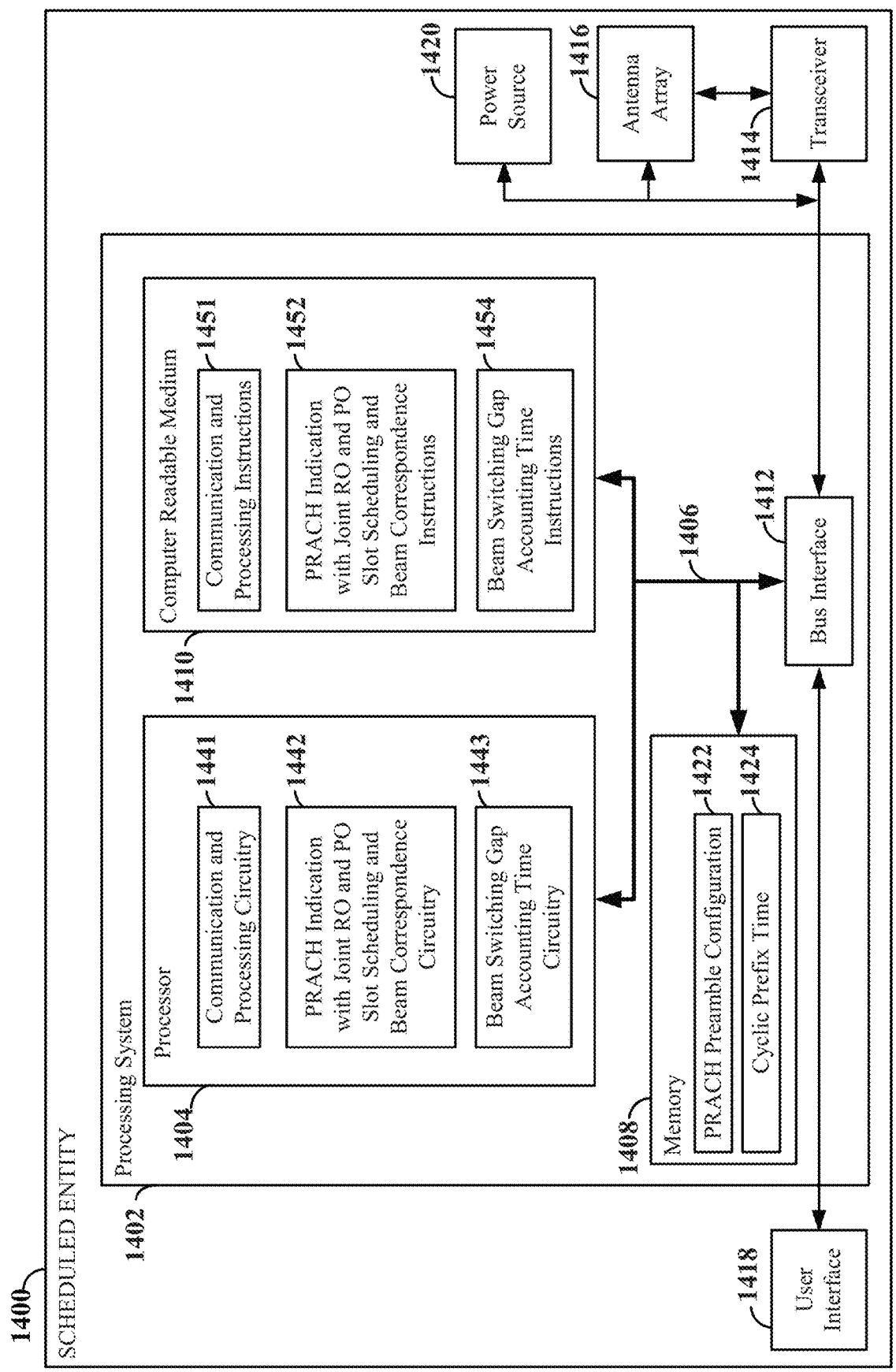
FIG. 14 is a block diagram illustrating an example of a hardware implementation of a scheduled entity employing a processing system according to some aspects of the disclosure.

FIG. 14 is a block diagram illustrating an example of a hardware implementation of a scheduled entity 1400 (e.g., a UE) employing a processing system 1402 according to some aspects of the disclosure. The scheduled entity 1400 may be, for example, any scheduled entity or UE as illustrated in any one or more of FIGS. 1, 2, 4, 5, and/or 6.

In accordance with various aspects of the disclosure, an element, or any portion of an element, or any combination of elements may be implemented with a processing system 1402 that includes one or more processors, such as processor 1404. The processing system 1402 may be substantially the same as the processing system 1102 illustrated and described in connection with FIG. 11, including a bus interface 1412, a bus 1406, a memory 1408, a processor 1404, and a computer-readable medium 1410. Furthermore, the scheduled entity 1400 may include a user interface 1418, a transceiver 1414, an antenna array 1416, and power source 1420, substantially similar to those described above in FIG. 11. Accordingly, their descriptions will not be repeated for the sake of brevity.

In some aspects of the disclosure, the processor 1404 may include communication and processing circuitry 1441 configured for various functions, including, for example, communicating with a scheduling entity (e.g., a base station, a gNB), other scheduled entities, or any other entity, such as, for example, local infrastructure. In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1441 may include one or more transmit/receive chains.

In some implementations where the communication involves receiving information, the communication and processing circuitry 1441 may obtain or identify information from a component of the scheduled entity 1400 (e.g., from the transceiver 1414 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1408, or to the bus interface 1412. In some examples, the communication and processing circuitry 1441 may receive one or more of: signals, messages, other information, or any combination thereof. In some examples, the communication and processing circuitry 1441 may receive information via one or more channels. In some examples, the communication and processing circuitry 1441 may include functionality for a means for receiving. In some examples, the communication and processing circuitry 1441 may include functionality for a means for processing, including a means for demodulating, a means for decoding, etc.

In some implementations where the communication involves sending (e.g., transmitting) information, the communication and processing circuitry 1441 may obtain or identify information (e.g., from another component of the processor 1404, the memory 1408, or the bus interface 1412), process (e.g., modulate, encode, etc.) the information, and output the processed information. For example, the communication and processing circuitry 1441 may output the information to the transceiver 1414 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., a means for transmitting). In some examples, the communication and processing circuitry 1441 may include functionality for a means for generating, including a means for modulating, a means for encoding, etc. In some examples, the communication and processing circuitry 1441 may be configured to receive and process downlink traffic and downlink control messages (e.g., similar to downlink traffic 112 and downlink control 114) and process and transmit uplink traffic and uplink control messages (e.g., similar to uplink traffic 116 and uplink control 118 of FIG. 1) via the antenna array 1416 and the transceiver 1414.

In some examples, the communication and processing circuitry 1441 may further be configured to map, in at least one joint RO and PO slot, at least a first RO to at least a first PO based on a commonality of a scheduled entity identifier in each of a transmitted PRACH preamble in the at least the first RO and a transmitted PUSCH preamble in the at least the first PO. The communication and processing circuitry 1441 may further be configured to select a time gap between the at least the first RO and the at least the first PO from among a plurality of time gaps associated with the at least the first RO and the at least the first PO based on a level of capability of the scheduled entity 1400. The communication and processing circuitry 1441 may further be configured to receive a guard time, which may be a time separating the at least the first RO and the at least the first PO. According to some examples, the at least one joint RO and PO slot may be repeated in accordance with a predefined joint RO and PO configuration period.

Some resource configurations may also include at least a third RO and at least a third PO within the at least one joint RO and PO slot, the at least the third RO and the at least the third PO: corresponding to the first beam of a plurality of beams of a scheduling entity, and corresponding to respective symbols of the at least the first RO and the at least the first PO. In such resource configurations, a frequency guard period may be set between the at least the first PO and the at least the third PO in the joint RO and PO slot. In some examples, a frequency guard period may be set between any two POs (and/or ROs) in a set of PRACH-PUSCH resources in the joint RO and PO slot.

In some examples, the communication and processing circuitry 1441 may include one or more hardware components that provide the physical structure that performs processes related to, for example, mapping, in at least one joint RO and PO slot, at least a first RO to at least a first PO based on a commonality of a scheduled entity identifier in each of a received PRACH preamble in the at least the first RO and a received PUSCH preamble in the at least the first PO, selecting a time gap between the at least the first RO and the at least the first PO from among a plurality of time gaps associated with the at least the first RO and the at least the first PO based on a level of capability of the scheduled entity, recognizing a repetition of the at least one joint RO and PO slot in accordance with a predefined joint RO and PO configuration period, recognizing a frequency guard period set between the at least the first PO and the at least the third PO in the joint RO and PO slot, and/or recognizing a frequency guard period between any two POs (and/or ROs) in a set of PRACH-PUSCH resources in the joint RO and PO slot. The communication and processing circuitry 1441 may further be configured to execute communication and processing software 1451 stored on the computer-readable medium 1410 to implement one or more functions described herein.

In some aspects of the disclosure, the processor 1404 may include PRACH indication with joint RO and PO slot scheduling and beam correspondence circuitry 1442 configured for various functions, including, for example, receiving a PRACH indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of a scheduling entity. In some examples, the joint RO and PO slot may correspond to a plurality of contiguous slots that collectively include a plurality of RO and PO combinations scheduled consecutively in time. The joint RO and PO slot may span a plurality of PRACH slots in some examples. In some examples, the at least the first RO and the at least the first PO may be a first RO and PO combination, and the PRACH indication may further indicate resources of at least a second RO and at least a second PO within the at least one joint RO and PO slot. In such examples, the at least the second RO and the at least the second PO: may be a second RO and PO combination that may correspond to a second beam of the plurality of beams of the scheduling entity, the second beam being different from the first beam. The second RO and PO combination may be spaced apart in time from the first RO and PO combination.

In some examples, the PRACH indication with joint RO and PO slot scheduling and beam correspondence circuitry 1442 may include one or more hardware components that alone, or in combination with other circuits, such as, for example, the transceiver 1414, the antenna array 1416, and/or the memory 1408, may provide the physical structure that performs processes related to receiving a PRACH indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of the scheduling entity. In the examples where the at least the first RO and the at least the first PO are a first RO and PO combination, and the PRACH indication may further indicate resources of at least a second RO and at least a second PO within the at least one joint RO and PO slot, the PRACH indication with joint RO and PO slot scheduling and beam correspondence circuitry 1442, alone, or in combination with the other circuits, such as the transceiver 1414, the antenna array 1416, and/or the memory 1408, may provide the physical structure that performs processes related to receiving the PRACH indication that may further indicate resources of the at least the second RO and the at least the second PO, where the at least the second RO and the at least the second PO: may be a second RO and PO combination, may correspond to a second beam of the plurality of beams of the scheduling entity, the second beam being different from the first beam, and may be spaced apart in time from the first RO and PO combination. By way of example, the memory 1408 of the processing system 1402 may store a PRACH preamble configuration table 1422 that may cross-reference PRACH preamble configuration index values (which may be received) to the quantity and slot numbers of Reference slots per radio frame, and to PRACH preamble formats, among other information. The PRACH preamble configuration may be included with and received in the PRACH indication. The PRACH indication with joint RO and PO slot scheduling and beam correspondence circuitry 1442 may further be configured to execute PRACH indication with joint RO and PO slot scheduling and beam correspondence software 1452 stored on the computer-readable medium 1410 to implement one or more functions described herein.

In some aspects of the disclosure, the processor 1404 may include beam switching gap accounting time circuitry 1443 configured for various functions, including, for example, receiving a beam switching gap accounting time between the first RO and PO combination and the second RO and PO combination in response to a difference between a cyclic prefix time and a maximum beam switching gap time being less than a threshold.

In one example, in response to the difference between the cyclic prefix time and the maximum beam switching gap time (e.g., where the difference is equal to cyclic prefix time—maximum beam switching gap time) being less than the threshold, the scheduling entity may have added a beam switching gap accounting time between the RO and PO pair(s) associated with a first beam and the RO and PO pair(s) associated with a second beam, different from the first beam. According to some examples, the beam switching gap accounting time plus the cyclic prefix time may be greater than the maximum beam switching gap time and less than a duration of one symbol of the joint RO and PO slot. According to some aspects, the beam switching gap accounting time circuitry 1443, in connection with, for example, the transceiver 1414, the antenna array 1416, and the memory 1408, may receive an indication of the beam switching gap accounting time at least one of: semi-statically, or dynamically. In some examples, the cyclic prefix time may be stored, for example, in a cyclic prefix time table 1424 in the memory 1408 of the processing system 1402.

In some examples, the beam switching gap accounting time circuitry 1443 may perform additional functions, including, for example, in examples where the at least the first RO and the at least the first PO are a first RO and PO combination, receiving the PRACH indication with an additional indication of resources of at least a second RO and at least a second PO within the at least one joint RO and PO slot. The at least the second RO and the at least the second PO may be a second RO and PO combination, and the at least the second RO and the at least the second PO may correspond to a second beam of the plurality of beams of the scheduling entity, the second beam being different from the first beam. In such examples, the beam switching gap accounting time circuitry 1443 may perform an additional function of, for example, recognizing and implementing the beam switching gap accounting time between the first RO and PO combination and the second RO and PO combination. According to some aspects, the beam switching gap accounting time may be received at least one of: semi-statically, or dynamically.

In some examples, the beam switching gap accounting time circuitry 1443 may include one or more hardware components that alone, or in combination with other circuits, such as, for example, the communication and processing circuitry 1441, the transceiver 1414, the antenna array 1416, and/or the memory 1408, may provide the physical structure that performs processes related to receiving a beam switching gap accounting time between the first RO and PO combination and the second RO and PO combination in response to a difference between the cyclic prefix time and the maximum beam switching gap time being less than a threshold. In some examples, the one or more hardware components that alone, or in combination with other circuits, such as, for example, the communication and processing circuitry 1441, the transceiver 1414, the antenna array 1416, and/or the memory 1408, may, add the beam switching gap accounting time between the RO and PO pair(s) associated with a first beam and the RO and PO pair(s) associated with a second beam, different from the first beam. In such examples, the beam switching gap accounting time plus the cyclic prefix time may be greater than the maximum beam switching gap time and less than a duration of one symbol of the joint RO and PO slot. According to some aspects, the one or more hardware components that alone, or in combination with other circuits, such as, for example, the transceiver 1414 and the antenna array 1416, may receive an indication of the beam switching gap accounting time at least one of: semi-statically, or dynamically.

The beam switching gap accounting time circuitry 1443 may further be configured to execute beam switching gap accounting time software 1453 stored on the computer-readable medium 1410 to implement one or more functions described herein.

Figure 15:
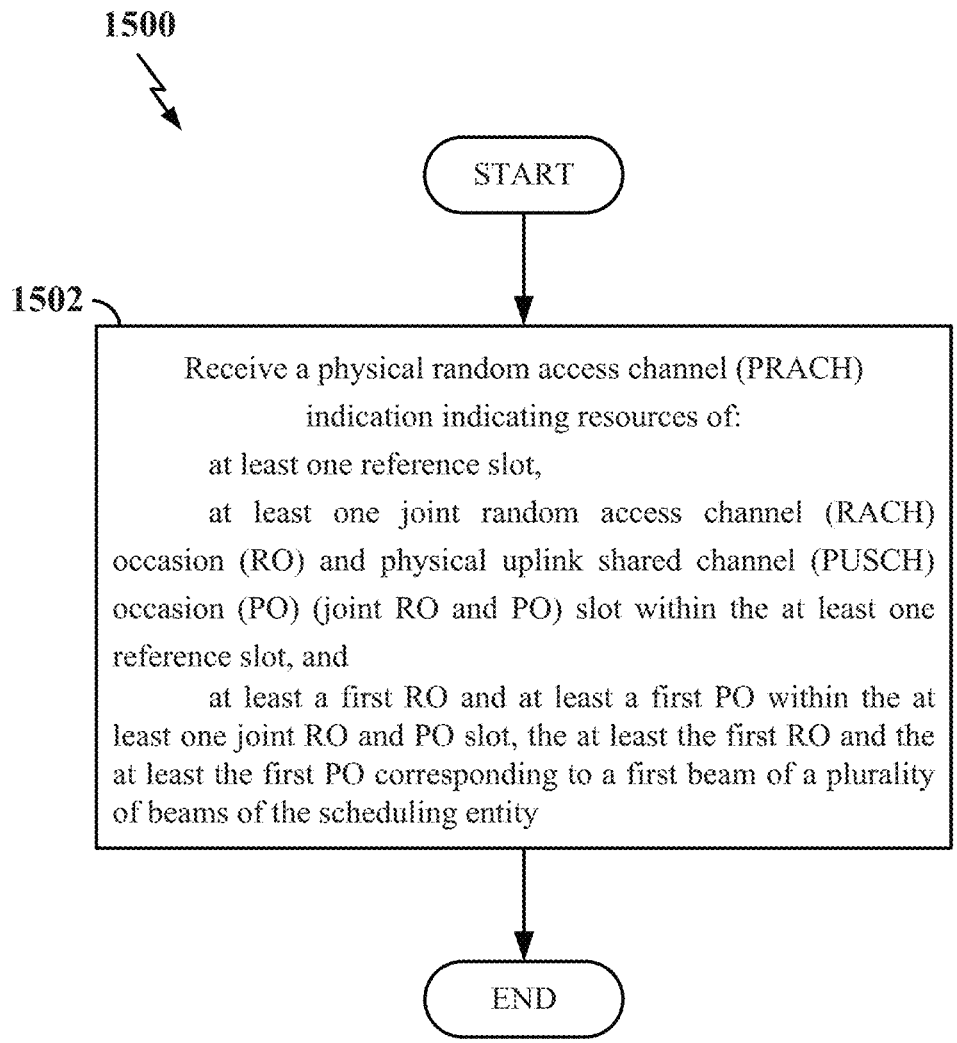
FIG. 15 is a flow chart illustrating an exemplary process at a scheduled entity according to some aspects of the disclosure.

FIG. 15 is a flow chart illustrating an exemplary process 1500 (e.g., a method of wireless communication) at a scheduled entity (e.g., a UE) in a wireless communication network according to some aspects of the disclosure. As described below, some or all illustrated features may be omitted in a particular implementation within the scope of the present disclosure, and some illustrated features may not be required for all implementations. In some examples, the process 1500 may be carried out by the scheduled entity 1400 illustrated in FIG. 14. In some examples, the process 1500 may be carried out by any suitable apparatus or means for carrying out the functions or algorithms described herein.

At block 1502, the scheduled entity may receive a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to a first beam of a plurality of beams of a scheduling entity. For example, the PRACH indication with joint RO and PO slot scheduling and beam correspondence circuitry 1442, in connection with, for example, the transceiver 1414, antenna array 1416, and/or the memory 1408, as shown and described above in connection with FIG. 14, may provide a means for transmitting a PRACH indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to a first beam of a plurality of beams of the scheduling entity.

In some aspects, the scheduled entity may map the at least the first RO to the at least the first PO based on a commonality of a scheduled entity identifier in each of a transmitted PRACH preamble in the at least the first RO and a transmitted PUSCH preamble in the at least the first PO. In some aspects, the scheduled entity may select a time gap between the at least the first RO and the at least the first PO from among a plurality of time gaps associated with the at least the first RO and the at least the first PO based on a level of capability of the scheduled entity. For example, the communication and processing circuitry 1441, shown and described above in connection with FIG. 14, may provide a means for mapping the at least the first RO to the at least the first PO based on a commonality of a scheduled entity identifier in each of a received PRACH preamble in the at least the first RO and a received PUSCH preamble in the at least the first PO. The communication and processing circuitry 1441, shown and described above in connection with FIG. 14, may also provide a means for selecting a time gap between the at least the first RO and the at least the first PO from among a plurality of time gaps associated with the at least the first RO and the at least the first PO based on a level of capability of the scheduled entity.

As described above, there may be examples where the at least the first RO and the at least the first PO are a first RO and PO combination, and the PRACH indication may further indicate resources of at least a second RO and at least a second PO within the at least one joint RO and PO slot. By way of example, the PRACH indication with joint RO and PO slot scheduling and beam correspondence circuitry 1442, shown and described above in connection with FIG. 14, may provide a means for receiving an indication of a beam switching gap accounting time, scheduling a time between the first RO and PO combination and the second RO and PO combination in response to a difference between a cyclic prefix time and a maximum beam switching gap time being less than a threshold. As indicated above, the at least the second RO and the at least the second PO: may be a second RO and PO combination, may correspond to a second beam of the plurality of beams of the scheduling entity, the second beam being different from the first beam, and may be spaced apart in time from the first RO and PO combination. In some examples, the beam switching gap accounting time plus the cyclic prefix time may be greater than the maximum beam switching gap time and less than a duration of one symbol of the joint RO and PO slot.

In some examples, the beam switching gap accounting time circuitry 1443, the transceiver 1414, and the antenna array 1416, shown and described above in connection with FIG. 14, may provide a means for receiving an indication of the beam switching gap accounting time at least one of: semi-statically, or dynamically.

According to some aspects, the communication and processing circuitry 1441, shown and described above in connection with FIG. 14, may provide a means for configuring the scheduled entity to receive repetitions of the at least one joint RO and PO slot in accordance with a predefined joint RO and PO configuration period. According to some aspects, the PRACH indication with joint RO and PO slot scheduling and beam correspondence circuitry 1442, shown and described above in connection with FIG. 14, may provide a means for receiving, within the PRACH indication, a further indication of resources of at least a third RO and at least a third PO within the at least one joint RO and PO slot. The at least the third RO and the at least the third PO may correspond to the first beam of the plurality of beams of the scheduling entity, and may correspond to respective symbols of the at least the first RO and the at least the first PO. In such examples, the PRACH indication with joint RO and PO slot scheduling and beam correspondence circuitry 1442, shown and described above in connection with FIG. 14, may also provide a means for configuring the scheduled entity to recognize a frequency guard period set between the at least the first PO and the at least the third PO in the joint RO and PO slot.

Of course, in the above examples, the circuitry included in the processor 1404 is merely provided as an example. Other means for carrying out the described functions may be included within various aspects of the present disclosure, including but not limited to the instructions stored in the computer-readable medium 1410 or any other suitable apparatus or means described in any one of the FIGS. 1, 2, 4, 5, and/or 14, and utilizing, for example, the processes and/or algorithms described herein in relation to FIGS. 4, 5, 6, 7, 8, 9, 10, and/or 15.

The following provides an overview of aspects of the present disclosure:

Aspect 1: A scheduled entity in a wireless communication network, comprising: a wireless transceiver, a memory, and a processor coupled to the wireless transceiver and the memory, the processor and the memory configured to: receive a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of a scheduling entity.

Aspect 2: The scheduled entity of aspect 1, wherein the processor and the memory are further configured to: map the at least the first RO to the at least the first PO based on a commonality of a scheduled entity identifier in each of a transmitted PRACH preamble in the at least the first RO and a transmitted PUSCH preamble in the at least the first PO.

Aspect 3: The scheduled entity of aspect 1 or 2, wherein the processor and the memory are further configured to: select a time gap between the at least the first RO and the at least the first PO from among a plurality of time gaps associated with the at least the first RO and the at least the first PO based on a level of capability of the scheduled entity.

Aspect 4: The scheduled entity of any of aspects 1 through 3, wherein the at least the first RO and the at least the first PO are a first RO and PO combination, and the PRACH indication further indicates resources of at least a second RO and at least a second PO within the at least one joint RO and PO slot, the at least the second RO and the at least the second PO: are a second RO and PO combination, correspond to a second beam of the plurality of beams of the scheduling entity, the second beam being different from the first beam, and are spaced apart in time from the first RO and PO combination, and the processor and the memory are further configured to: receive an indication of a beam switching gap accounting time, scheduling a time between the first RO and PO combination and the second RO and PO combination in response to a difference between a cyclic prefix time and a maximum beam switching gap time being less than a threshold.

Aspect 5: The scheduled entity of aspect 4, wherein the beam switching gap accounting time plus the cyclic prefix time is greater than the maximum beam switching gap time and less than a duration of one symbol of the joint RO and PO slot.

Aspect 6: The scheduled entity of aspect 4, wherein the processor and the memory are further configured to: receive the indication of the beam switching gap accounting time at least one of: semi-statically, or dynamically.

Aspect 7: The scheduled entity of any of aspects 1 through 6, wherein the joint RO and PO slot corresponds to a plurality of contiguous slots that collectively include a plurality of RO and PO combinations scheduled consecutively in time.

Aspect 8: The scheduled entity of any of aspects 1 through 7, wherein the at least one joint RO and PO slot are repeated in accordance with a predefined joint RO and PO configuration period.

Aspect 9: The scheduled entity of any of aspects 1 through 8, wherein the PRACH indication further indicates resources of: at least a third RO and at least a third PO within the at least one joint RO and PO slot, the at least the third RO and the at least the third PO: correspond to the first beam of the plurality of beams of the scheduling entity, and correspond to respective symbols of the at least the first RO and the at least the first PO.

Aspect 10: The scheduled entity of aspect 9, wherein a frequency guard period is set between the at least the first PO and the at least the third PO in the joint RO and PO slot.

Aspect 11: A scheduling entity in a wireless communication network, comprising: a wireless transceiver, a memory, and a processor coupled to the wireless transceiver and the memory, the processor and the memory configured to: transmit a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of the scheduling entity.

Aspect 12: The scheduling entity of aspect 11, wherein the processor and the memory are further configured to: map the at least the first RO to the at least the first PO based on a commonality of a scheduled entity identifier in each of a received PRACH preamble in the at least the first RO and a received PUSCH preamble in the at least the first PO.

Aspect 13: The scheduling entity of aspect 11 or 12, wherein the processor and the memory are further configured to: schedule a time gap, based on a level of capability of a scheduled entity, between the at least the first RO and the at least the first PO.

Aspect 14: The scheduling entity of any of aspects 11 through 13, wherein the at least the first RO and the at least the first PO are a first RO and PO combination, and the PRACH indication further indicating resources of at least a second RO and at least a second PO within the at least one joint RO and PO slot, the at least the second RO and the at least the second PO: are a second RO and PO combination, correspond to a second beam of the plurality of beams of the scheduling entity, the second beam being different from the first beam, and are spaced apart in time from the first RO and PO combination, and the processor and the memory are further configured to: obtain a maximum beam switching gap time corresponding to a maximum amount of time used by the scheduling entity to switch between the first beam and the second beam, obtain a cyclic prefix time corresponding to a message associated with the at least the second RO, and schedule a beam switching gap accounting time between the first RO and PO combination and the second RO and PO combination in response to a difference between the cyclic prefix time and the maximum beam switching gap time being less than a threshold.

Aspect 15: The scheduling entity of aspect 14, wherein the beam switching gap accounting time plus the cyclic prefix time is greater than the maximum beam switching gap time and less than a duration of one symbol of the joint RO and PO slot.

Aspect 16: The scheduling entity of aspect 14, wherein the processor and the memory are further configured to: transmit an indication of the beam switching gap accounting time at least one of: semi-statically, or dynamically.

Aspect 17: The scheduling entity of any of aspects 11 through 16, wherein the joint RO and PO slot corresponds to a plurality of contiguous slots that collectively include a plurality of RO and PO combinations scheduled consecutively in time.

Aspect 18: The scheduling entity of any of aspects 11 through 17, wherein the processor and the memory are further configured to: repeat the at least one joint RO and PO slot in accordance with a predefined joint RO and PO configuration period.

Aspect 19: The scheduling entity of any of aspects 11 through 18, wherein the PRACH indication further indicates resources of: at least a third RO and at least a third PO within the at least one joint RO and PO slot, the at least the third RO and the at least the third PO: correspond to the first beam of the plurality of beams of the scheduling entity, and correspond to respective symbols of the at least the first RO and the at least the first PO.

Aspect 20: The scheduling entity of aspect 19, wherein the processor and the memory are further configured to: set a frequency guard period between the at least the first PO and the at least the third PO in the joint RO and PO slot.

Aspect 21: A method of wireless communication in a wireless communication network, the method comprising, at a scheduling entity: transmitting a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of the scheduling entity.

Aspect 22: The method of aspect 21, further comprising: mapping the at least the first RO to the at least the first PO based on a commonality of a scheduled entity identifier in each of a received PRACH preamble in the at least the first RO and a received PUSCH preamble in the at least the first PO.

Aspect 23: The method of aspect 21 or 22, further comprising: scheduling a time gap, based on a level of capability of a scheduled entity, between the at least the first RO and the at least the first PO.

Aspect 24: The method of any of aspects 21 through 23, wherein the at least the first RO and the at least the first PO are a first RO and PO combination, and the PRACH indication further indicates resources of at least a second RO and at least a second PO within the at least one joint RO and PO slot, the at least the second RO and the at least the second PO: are a second RO and PO combination, correspond to a second beam of the plurality of beams of the scheduling entity, the second beam being different from the first beam, and are spaced apart in time from the first RO and PO combination, the method further comprising: obtaining a maximum beam switching gap time corresponding to a maximum amount of time used by the scheduling entity to switch between the first beam and the second beam, obtaining a cyclic prefix time corresponding to a message associated with the at least the second RO, and scheduling a beam switching gap accounting time between the first RO and PO combination and the second RO and PO combination in response to a difference between the cyclic prefix time and the maximum beam switching gap time being less than a threshold.

Aspect 25: The method of aspect 24, wherein the beam switching gap accounting time plus the cyclic prefix time is greater than the maximum beam switching gap time and less than a duration of one symbol of the joint RO and PO slot.

Aspect 26: The method of aspect 24, further comprising: transmitting an indication of the beam switching gap accounting time at least one of: semi-statically, or dynamically.

Aspect 27. The method of any of aspects 21 through 26, wherein the joint RO and PO slot corresponds to a plurality of contiguous slots that collectively include a plurality of RO and PO combinations scheduled consecutively in time.

Aspect 28: The method of any of aspects 21 through 27, further comprising: repeating the at least one joint RO and PO slot in accordance with a predefined joint RO and PO configuration period.

Aspect 29: The method of any of aspects 21 through 2, wherein the PRACH indication further indicates resources of: at least a third RO and at least a third PO within the at least one joint RO and PO slot, the at least the third RO and the at least the third PO: correspond to the first beam of the plurality of beams of the scheduling entity, and correspond to respective symbols of the at least the first RO and the at least the first PO.

Aspect 30: The method of aspect 29, further comprising: setting a frequency guard period between the at least the first PO and the at least the third PO in the joint RO and PO slot.

Aspect 31: A method at a scheduled entity, comprising: receiving a physical random access channel (PRACH) indication indicating resources of: at least one reference slot, at least one joint random access channel (RACH) occasion (RO) and physical uplink shared channel (PUSCH) occasion (PO) (joint RO and PO) slot within the at least one reference slot, and at least a first RO and at least a first PO within the at least one joint RO and PO slot, the at least the first RO and the at least the first PO corresponding to each other and corresponding to a first beam of a plurality of beams of a scheduling entity.

Aspect 32: The method of aspect 31, further comprising: mapping the at least the first RO to the at least the first PO based on a commonality of a scheduled entity identifier in each of a transmitted PRACH preamble in the at least the first RO and a transmitted PUSCH preamble in the at least the first PO.

Aspect 33: The method of aspect 31 or 32, further comprising: selecting a time gap between the at least the first RO and the at least the first PO from among a plurality of time gaps associated with the at least the first RO and the at least the first PO based on a level of capability of the scheduled entity.

Aspect 34: The method of any of aspects 31 through 33, wherein the at least the first RO and the at least the first PO are a first RO and PO combination, and the PRACH indication further indicates resources of at least a second RO and at least a second PO within the at least one joint RO and PO slot, the at least the second RO and the at least the second PO: are a second RO and PO combination, corresponding to a second beam of the plurality of beams of the scheduling entity, the second beam being different from the first beam, and are spaced apart in time from the first RO and PO combination, the method further comprising: receiving an indication of a beam switching gap accounting time, which schedules a time between the first RO and PO combination and the second RO and PO combination in response to a difference between a cyclic prefix time and a maximum beam switching gap time being less than a threshold.

Aspect 35: The method of aspect 34, wherein the beam switching gap accounting time plus the cyclic prefix time is greater than the maximum beam switching gap time and less than a duration of one symbol of the joint RO and PO slot.

Aspect 36: The method of aspect 34, further comprising: receiving the indication of the beam switching gap accounting time at least one of: semi-statically, or dynamically.

Aspect 37: The method of any of aspects 31 through 36, wherein the joint RO and PO slot corresponds to a plurality of contiguous slots that collectively include a plurality of RO and PO combinations scheduled consecutively in time.

Aspect 38: The method of any of aspects 31 through 37, wherein the at least one joint RO and PO slot are repeated in accordance with a predefined joint RO and PO configuration period.

Aspect 39: The method of any of aspects 31 through 38, wherein the PRACH indication further indicates resources of: at least a third RO and at least a third PO within the at least one joint RO and PO slot, the at least the third RO and the at least the third PO: correspond to the first beam of the plurality of beams of the scheduling entity, and correspond to respective symbols of the at least the first RO and the at least the first PO.

Aspect 40: The method of aspect 39, wherein a frequency guard period is set between the at least the first PO and the at least the third PO in the joint RO and PO slot.

Aspect 41: An apparatus configured for wireless communication comprising at least one means for performing a method of any one of aspects 21 through 30 or 31 through 40.

Aspect 31: A non-transitory computer-readable medium storing computer-executable code, comprising code for causing an apparatus to perform a method of any one of aspects 21 through 30 or 31 through 40.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover: A; B; and A and B. The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A scheduled entity in a wireless communication network, comprising:
   one or more wireless transceivers;
   one or more memories; and
   one or more processors coupled to the one or more wireless transceivers and the one or more memories, the one or more processors configured to:
      receive a physical random access channel (PRACH) indication indicating resources of:
         at least one reference slot,
         at least one joint random access channel (RACH) occasion (RO) and physical uplink shared channel (PUSCH) occasion (PO) (joint RO and PO) slot within the at least one reference slot, and
         at least a first RO and at least a first PO within the at least one joint RO and PO slot, the at least the first RO and the at least the first PO corresponding to each other and corresponding to a first beam of a plurality of beams of a scheduling entity,
      wherein the at least one joint RO and PO slot is repeated in accordance with a predefined joint RO and PO configuration period.

2. The scheduled entity of claim 1, wherein the one or more processors are further configured to:
   map the at least the first RO to the at least the first PO based on a commonality of a scheduled entity identifier in each of a transmitted PRACH preamble in the at least the first RO and a transmitted PUSCH preamble in the at least the first PO.

3. The scheduled entity of claim 1, wherein the one or more processors are further configured to:
   select a time gap between the at least the first RO and the at least the first PO from among a plurality of time gaps associated with the at least the first RO and the at least the first PO based on a level of capability of the scheduled entity.

4. The scheduled entity of claim 1, wherein the at least the first RO and the at least the first PO are a first RO and PO combination, and the PRACH indication further indicates resources of at least a second RO and at least a second PO within the at least one joint RO and PO slot, the at least the second RO and the at least the second PO:
   are a second RO and PO combination,
   correspond to a second beam of the plurality of beams of the scheduling entity, the second beam being different from the first beam, and
   are spaced apart in time from the first RO and PO combination, and the one or more processors are further configured to:
      receive an indication of a beam switching gap accounting time, scheduling a time between the first RO and PO combination and the second RO and PO combination in response to a difference between a cyclic prefix time and a maximum beam switching gap time being less than a threshold.

5. The scheduled entity of claim 4, wherein the beam switching gap accounting time plus the cyclic prefix time is greater than the maximum beam switching gap time and less than a duration of one symbol of the joint RO and PO slot.

6. The scheduled entity of claim 4, wherein the one or more processors are further configured to:
   receive the indication of the beam switching gap accounting time at least one of: semi-statically, or dynamically.

7. The scheduled entity of claim 1, wherein the joint RO and PO slot corresponds to a plurality of contiguous slots that collectively include a plurality of RO and PO combinations scheduled consecutively in time.

8. The scheduled entity of claim 1, wherein the PRACH indication further indicates resources of:
   at least a third RO and at least a third PO within the at least one joint RO and PO slot, the at least the third RO and the at least the third PO:
      correspond to the first beam of the plurality of beams of the scheduling entity, and correspond to respective symbols of the at least the first RO and the at least the first PO.

9. The scheduled entity of claim 8, wherein a frequency guard period is set between the at least the first PO and the at least the third PO in the joint RO and PO slot.

10. A scheduling entity in a wireless communication network, comprising:
one or more wireless transceivers;
one or more memories; and
one or more processors coupled to the one or more wireless transceivers and the one or more memories, the one or more processors configured to:
  transmit a physical random access channel (PRACH) indication indicating resources of:
    at least one reference slot,
    at least one joint random access channel (RACH) occasion (RO) and physical uplink shared channel (PUSCH) occasion (PO) (joint RO and PO) slot within the at least one reference slot, and
    at least a first RO and at least a first PO within the at least one joint RO and PO slot, the at least the first RO and the at least the first PO corresponding to each other and corresponding to a first beam of a plurality of beams of the scheduling entity; and
  repeat the at least one joint RO and PO slot in accordance with a predefined joint RO and PO configuration period.

11. The scheduling entity of claim 10, wherein the one or more processors are further configured to:
map the at least the first RO to the at least the first PO based on a commonality of a scheduled entity identifier in each of a received PRACH preamble in the at least the first RO and a received PUSCH preamble in the at least the first PO.

12. The scheduling entity of claim 10, wherein the one or more processors are further configured to:
schedule a time gap, based on a level of capability of a scheduled entity, between the at least the first RO and the at least the first PO.

13. The scheduling entity of claim 10, wherein the at least the first RO and the at least the first PO are a first RO and PO combination, and the PRACH indication further indicating resources of at least a second RO and at least a second PO within the at least one joint RO and PO slot, the at least the second RO and the at least the second PO:
are a second RO and PO combination,
correspond to a second beam of the plurality of beams of the scheduling entity, the second beam being different from the first beam, and
are spaced apart in time from the first RO and PO combination, and the one or more processors are further configured to:
  obtain a maximum beam switching gap time corresponding to a maximum amount of time used by the scheduling entity to switch between the first beam and the second beam;
  obtain a cyclic prefix time corresponding to a message associated with the at least the second RO; and
  schedule a beam switching gap accounting time between the first RO and PO combination and the second RO and PO combination in response to a difference between the cyclic prefix time and the maximum beam switching gap time being less than a threshold.

14. The scheduling entity of claim 13, wherein the beam switching gap accounting time plus the cyclic prefix time is greater than the maximum beam switching gap time and less than a duration of one symbol of the joint RO and PO slot.

15. The scheduling entity of claim 13, wherein the one or more processors are further configured to:
transmit an indication of the beam switching gap accounting time at least one of: semi-statically, or dynamically.

16. The scheduling entity of claim 10, wherein the joint RO and PO slot corresponds to a plurality of contiguous slots that collectively include a plurality of RO and PO combinations scheduled consecutively in time.

17. The scheduling entity of claim 10, wherein the PRACH indication further indicates resources of:
at least a third RO and at least a third PO within the at least one joint RO and PO slot, the at least the third RO and the at least the third PO:
  correspond to the first beam of the plurality of beams of the scheduling entity, and
  correspond to respective symbols of the at least the first RO and the at least the first PO.

18. The scheduling entity of claim 17, wherein the one or more processors are further configured to:
set a frequency guard period between the at least the first PO and the at least the third PO in the joint RO and PO slot.

19. A method of wireless communication in a wireless communication network, the method comprising, at a scheduling entity:
transmitting a physical random access channel (PRACH) indication indicating resources of:
  at least one reference slot,
  at least one joint random access channel (RACH) occasion (RO) and physical uplink shared channel (PUSCH) occasion (PO) (joint RO and PO) slot within the at least one reference slot, and
  at least a first RO and at least a first PO within the at least one joint RO and PO slot, the at least the first RO and the at least the first PO corresponding to each other and corresponding to a first beam of a plurality of beams of the scheduling entity; and
repeating the at least one joint RO and PO slot in accordance with a predefined joint RO and PO configuration period.

20. The method of claim 19, further comprising:
mapping the at least the first RO to the at least the first PO based on a commonality of a scheduled entity identifier in each of a received PRACH preamble in the at least the first RO and a received PUSCH preamble in the at least the first PO.

21. The method of claim 19, further comprising:
scheduling a time gap, based on a level of capability of a scheduled entity, between the at least the first RO and the at least the first PO.

22. The method of claim 19, wherein the at least the first RO and the at least the first PO are a first RO and PO combination, and the PRACH indication further indicates resources of at least a second RO and at least a second PO within the at least one joint RO and PO slot, the at least the second RO and the at least the second PO:
are a second RO and PO combination,
correspond to a second beam of the plurality of beams of the scheduling entity, the second beam being different from the first beam, and
are spaced apart in time from the first RO and PO combination, the method further comprising:

obtaining a maximum beam switching gap time corresponding to a maximum amount of time used by the scheduling entity to switch between the first beam and the second beam;

obtaining a cyclic prefix time corresponding to a message associated with the at least the second RO; and scheduling a beam switching gap accounting time between the first RO and PO combination and the second RO and PO combination in response to a difference between the cyclic prefix time and the maximum beam switching gap time being less than a threshold.

23. The method of claim 22, wherein the beam switching gap accounting time plus the cyclic prefix time is greater than the maximum beam switching gap time and less than a duration of one symbol of the joint RO and PO slot.

24. The method of claim 22, further comprising:
transmitting an indication of the beam switching gap accounting time at least one of: semi-statically, or dynamically.

25. The method of claim 19, wherein the joint RO and PO slot corresponds to a plurality of contiguous slots that collectively include a plurality of RO and PO combinations scheduled consecutively in time.

26. The method of claim 19, wherein the PRACH indication further indicates resources of:
at least a third RO and at least a third PO within the at least one joint RO and PO slot, the at least the third RO and the at least the third PO:
correspond to the first beam of the plurality of beams of the scheduling entity, and
correspond to respective symbols of the at least the first RO and the at least the first PO.

27. The method of claim 26, further comprising:
setting a frequency guard period between the at least the first PO and the at least the third PO in the joint RO and PO slot.

* * * * *